(12) United States Patent  
Chase

(10) Patent No.: US 6,596,958 B1
(45) Date of Patent: Jul. 22, 2003

(54) MODULAR WELDING GUNS

(75) Inventor: Wylie Chase, Waterford, MI (US)

(73) Assignee: Milco Manufacturing Co., Warren, MI (US)

( * ) Notice: Subject to any disclaimer, the term of this patent is extended or adjusted under 35 U.S.C. 154(b) by 91 days.

(21) Appl. No.: 09/641,264

(22) Filed: Aug. 17, 2000

Related U.S. Application Data

(60) Provisional application No. 60/149,337, filed on Aug. 17, 1999.

(51) Int. Cl.[7] .......................... B23K 11/31; B23K 11/30
(52) U.S. Cl. .................... 219/86.25; 219/86.8
(58) Field of Search ............... 219/86.25, 86.1, 219/86.21, 86.8

(56) References Cited

U.S. PATENT DOCUMENTS

| | | | | |
|---|---|---|---|---|
| 2,021,477 A | * | 11/1935 | Bohn ........................ 219/108 |
| 2,349,835 A | * | 5/1944 | Strickland, Jr. ............. 219/89 |
| 2,474,816 A | | 7/1949 | Briggs ........................... 219/4 |
| 3,396,260 A | * | 8/1968 | Waltonen ..................... 219/89 |
| 4,447,697 A | | 5/1984 | Dunne et al. ............ 219/86.41 |
| 4,473,734 A | | 9/1984 | Henry ....................... 219/86.8 |
| 4,504,725 A | | 3/1985 | Beneteau ................ 219/86.25 |
| 4,517,435 A | | 5/1985 | Humblot ..................... 219/89 |
| 4,550,236 A | | 10/1985 | Nakadate et al. ........ 219/86.31 |
| 4,551,605 A | * | 11/1985 | Numata et al. .......... 219/86.31 |
| 4,684,778 A | * | 8/1987 | Cecil .......................... 219/116 |
| 4,771,160 A | | 9/1988 | Pitsch et al. ................... 219/90 |
| 4,947,017 A | | 8/1990 | Beck ....................... 219/86.25 |
| 4,985,612 A | | 1/1991 | Izume et al. ............... 219/116 |
| 5,099,099 A | * | 3/1992 | Saito ........................... 219/89 |
| 5,113,053 A | * | 5/1992 | Umeda et al. ............. 219/116 |
| 5,117,337 A | * | 5/1992 | Sakuma ..................... 296/97.5 |
| 5,225,647 A | | 7/1993 | Dufrenne ................ 219/86.51 |
| 5,252,801 A | * | 10/1993 | Angel et al. ............ 219/86.61 |
| 5,340,960 A | | 8/1994 | Takasaki et al. ........... 219/86.7 |
| 5,386,092 A | | 1/1995 | Dufrenne ................ 219/86.32 |
| 5,405,075 A | | 4/1995 | Narita et al. ................ 228/102 |
| 5,412,172 A | | 5/1995 | Ichikawa et al. ........ 219/86.41 |
| 5,528,011 A | | 6/1996 | Kono et al. ............. 219/86.41 |
| 5,582,747 A | | 12/1996 | Sakai et al. ............. 219/86.41 |
| 5,789,719 A | * | 8/1998 | Pary et al. ............... 219/86.25 |
| 5,928,531 A | * | 7/1999 | Sato et al. ............... 219/86.25 |
| 6,271,496 B1 | * | 8/2001 | Domschot ................ 219/86.8 |

* cited by examiner

*Primary Examiner*—Tom Dunn
*Assistant Examiner*—Colleen Cooke
(74) *Attorney, Agent, or Firm*—Gifford, Krass, Groh, Sprinkle, Anderson & Citkowski, P.C.

(57) ABSTRACT

A modular welding gun includes a frame and an upper and lower yoke both interconnected with the frame. One of the yokes is movable with respect to the frame. An upper weld arm has one end removably interconnected with the upper yoke and the other end designed to support an electrode. A lower weld arm has one end removably interconnected with the lower yoke and the other end designed to support an electrode. An actuator is operable to move the movable yoke between a welding position and a rest position.

12 Claims, 27 Drawing Sheets

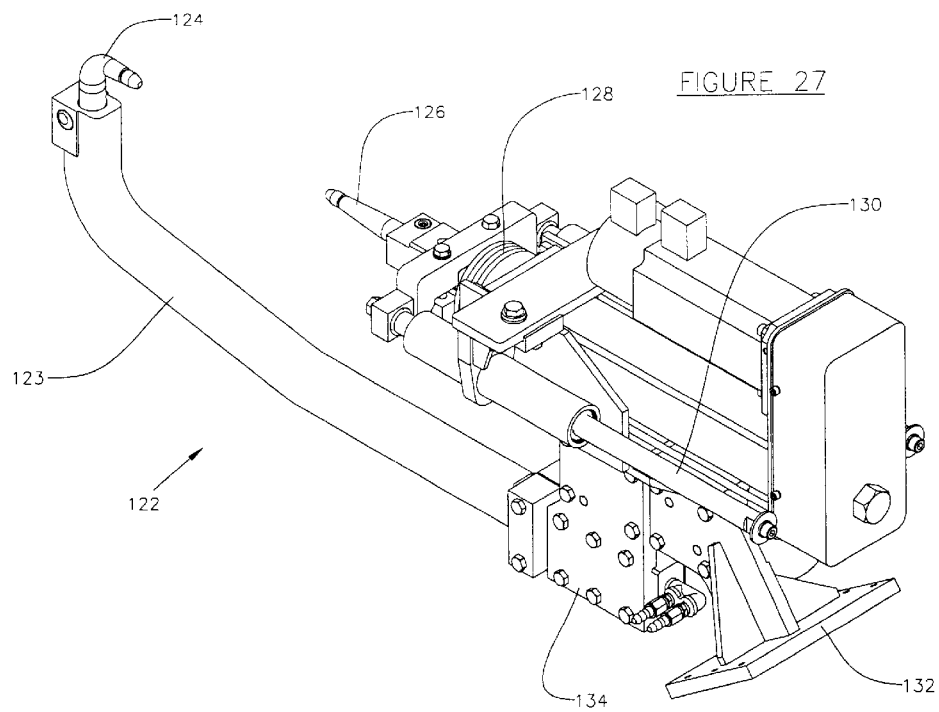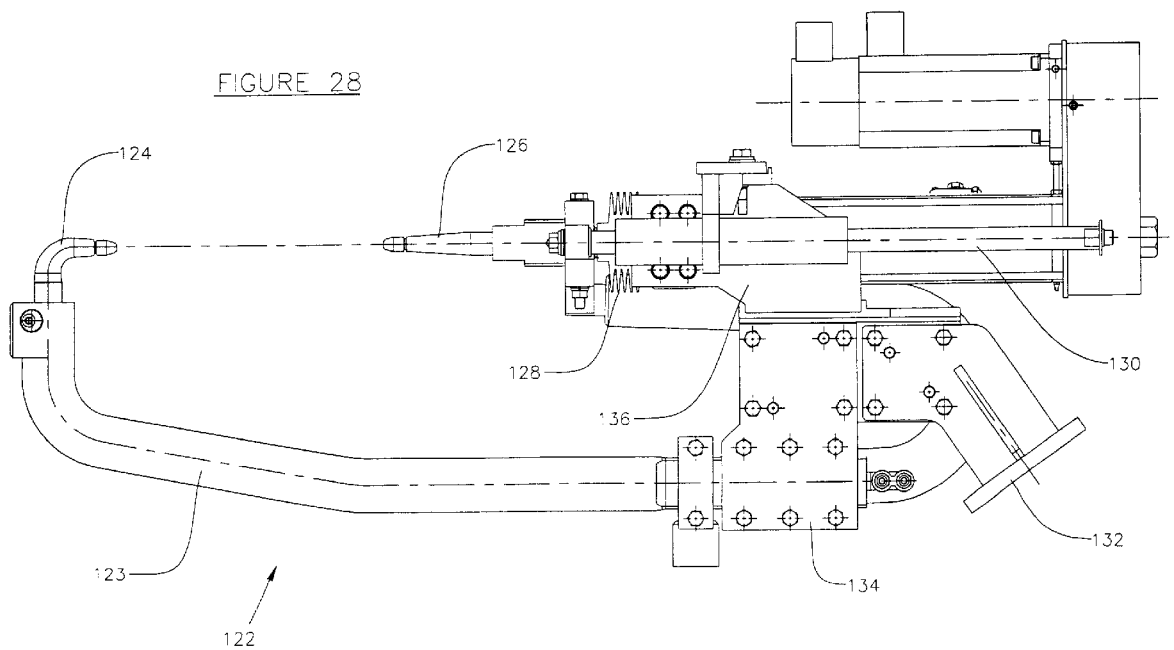

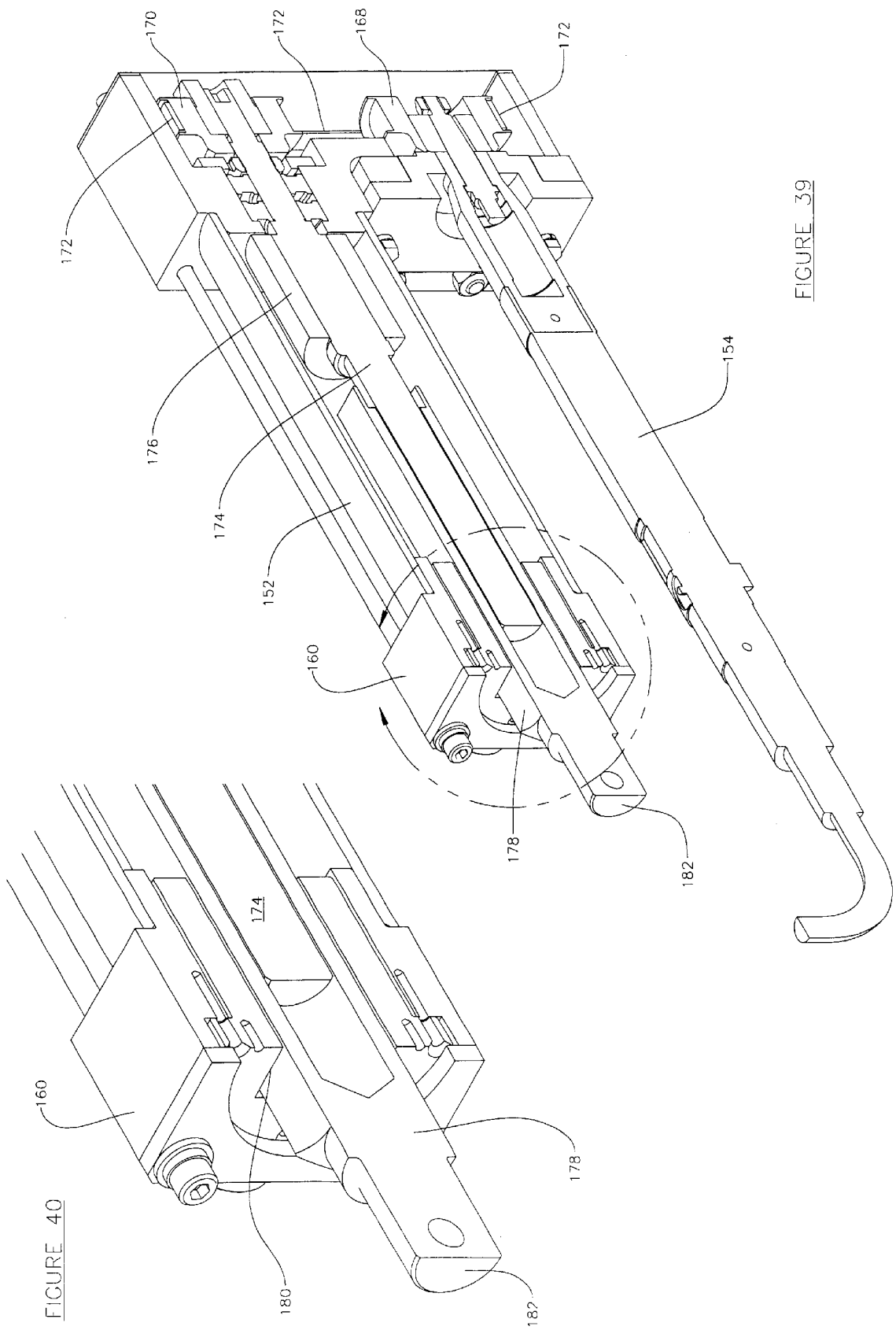

MODULAR WELDING GUNS

REFERENCE TO RELATED APPLICATION

This application claims priority from U.S. provisional patent application Ser. No. 60/149,337, filed Aug. 17, 1999, the entire contents of which are incorporated herein by reference.

FIELD OF THE INVENTION

The present invention relates generally to spot welding guns and, more specifically, to weld guns that are constructed from modular components.

BACKGROUND OF THE INVENTION

Traditional spot welding guns are usually custom manufactured for their intended application. These custom welding guns include welding arms that are moved by some type of actuator, such as a pneumatic or servo actuator. The welding arms, yokes, and pivots are often custom configured and may be part of a custom casting including the arms, yokes, pivot supports, and actuator arms. Obviously, custom casting portions of the weld gun raises the cost and complexity of the gun and increases the lead time required for providing the gun for a specific application. In light of this, there is a need for a modular approach to the design and construction of spot welding guns.

SUMMARY OF THE INVENTION

The present invention improves on the prior art by providing a modular welding gun including a frame and an upper and lower yoke that are both interconnected with the frame. At least one of the yokes is movable with respect to the frame. An upper weld arm has a first end that is removably interconnected with an upper yoke and a second end which is configured to support an electrode. A lower arm has a first end removable interconnected with the lower yoke, and a second end configured to support an electrode. An actuator is operable to move the movable yoke between a welding position and a rest position.

BRIEF DESCRIPTION OF THE DRAWINGS

FIG. 27 is a perspective view of the eighth embodiment of welding gun according to the present invention;

FIG. 28 is a side elevational view of the welding gun of FIGS. 27;

FIG. 39 is a cross-sectional view of a servo actuator of FIGS. 35–38;

FIG. 40 is a detailed view of the actuator end of the servo actuator of FIG. 39;

DETAILED DESCRIPTION OF THE PREFERRED EMBODIMENTS

Figure 1:
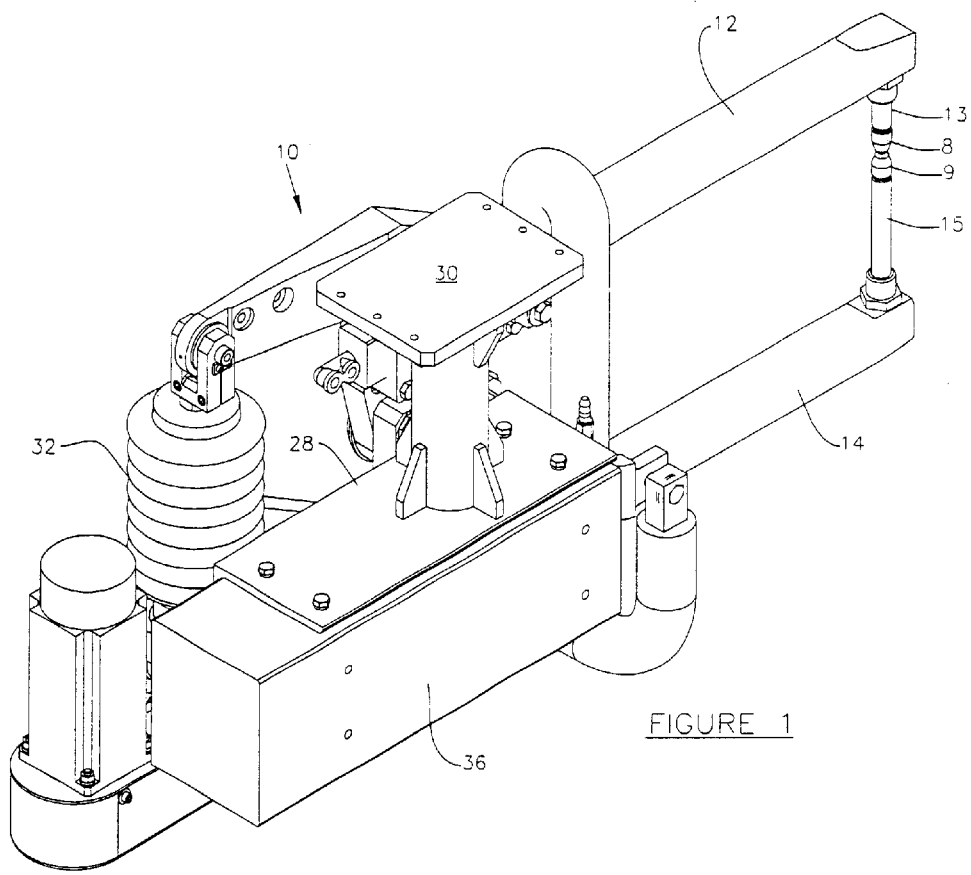
FIG. 1 is a perspective view of a first embodiment of a scissors-type modular weld gun according to the present invention.

Referring to FIGS. 1–4, a scissors type modular welding gun according to the present invention is generally shown at 10. This embodiment has an upper weld arm 12 and a lower weld arm 14 which are pivotally interconnected by fulcrum assembly 16. As shown, the fulcrum assembly includes an upper yoke 18, a lower yoke 20 and an isolating bearing assembly 22 that pivotally interconnects the yokes 18 and 20. The upper weld arm 12 clamps to the upper yoke 18 for movement therewith. An actuator arm 24 also clamps to the upper yoke 18 so that the upper weld arm 12, the upper yoke 18, and the actuator arm 24 move as a single unit. In prior approaches to constructing weld guns, the upper yoke 18, upper weld arm 12, and actuator arm 24 would be cast as a single unit requiring a custom casting. In the present invention, the upper yoke is formed from a flat piece of metal with standard bolts interconnecting it with the upper weld arm 12 and the actuator arm 24. The upper weld arm 12 is formed from a piece of copper bar stock, and is clamped to the upper yoke 18. Likewise, the actuator arm 24 is cut from a piece of aluminum stock and bolted to the upper yoke 18.

Likewise, the lower yoke 20 is bolted to the lower weld arm 14, which is formed from a piece of bar stock. Once again, traditional weld guns include a custom cast lower arm and yoke assembly whereas the present invention allows the use of standardized parts which may be bolted together to form a complete assembly.

Electrodes 13 and 15 are connected to the distal end of the upper and lower weld arms 12 and 14. The electrodes 13 and 15 each have bases connected to one of the weld arms 12 or 14 and distal welding ends extending towards one another. As known to those of skill in the art, weld caps 8 and 9 are connected to the welding ends of the electrodes 13 and 15, respectively. The weld caps 8 and 9 are brought into contact with one another, as shown in the figures.

Another difference between the present invention and the prior art is the construction of the bearing assembly 22. In traditional spot welding scissors type guns, the upper and lower yokes surround the bearing from both sides making access to the bearing for servicing difficult. In the present invention, the upper yoke 18 and lower yoke 22 lie side by side and the bearing assembly 22 pivotally interconnects them in a cantilever fashion. As shown, a through bolt 26 passes through the center of the bearing assembly to interconnect the upper yoke 18 and lower yoke 20. This greatly simplifies maintenance since the bearing assembly 20 may be disassembled using readily available wrenches.

The weld gun of FIGS. 1–4 also includes a main frame 28, which includes an integral robot mount 30 for mounting the weld gun 10 to a robot. The fulcrum 16 assembly mounts to the main frame 28, allowing the upper weld arm 12 to pivot relative thereto. The lower yoke 20 is also mounted to the main frame so that the lower arm does not move relative to the main frame. Alternatively, the lower arm may also pivot relative to the frame. A modular servo actuator 32 also mounts to the main frame 28 and is positioned behind the weld arms 12 and 14. The servo actuator 32 acts to move the actuator arm 24 upwardly and downwardly, thereby pivoting the upper weld arm 12 as required to open and close the electrodes 13 and 15. As shown, the servo actuator 32 has a fulcrum mount 34 allowing it to pivot slightly relative to the main frame 28 as it moves the upper weld arm 12. The main frame 28, including the robot mount 30 and the portion supporting the fulcrum mount 34 of the servo actuator, is all constructed from standardized components which bolt or weld together to form a complete assembly. Again, this is simpler than the prior art approach in which the main frame may be cast or fabricated to include the various mounting surfaces necessary. Also shown in FIGS. 1–4 is a transformer 36, which also mounts to the main frame 28. As will be clear to those of skill in the art, the transformer 36 may also be remotely mounted, depending on the application.

Figure 2:
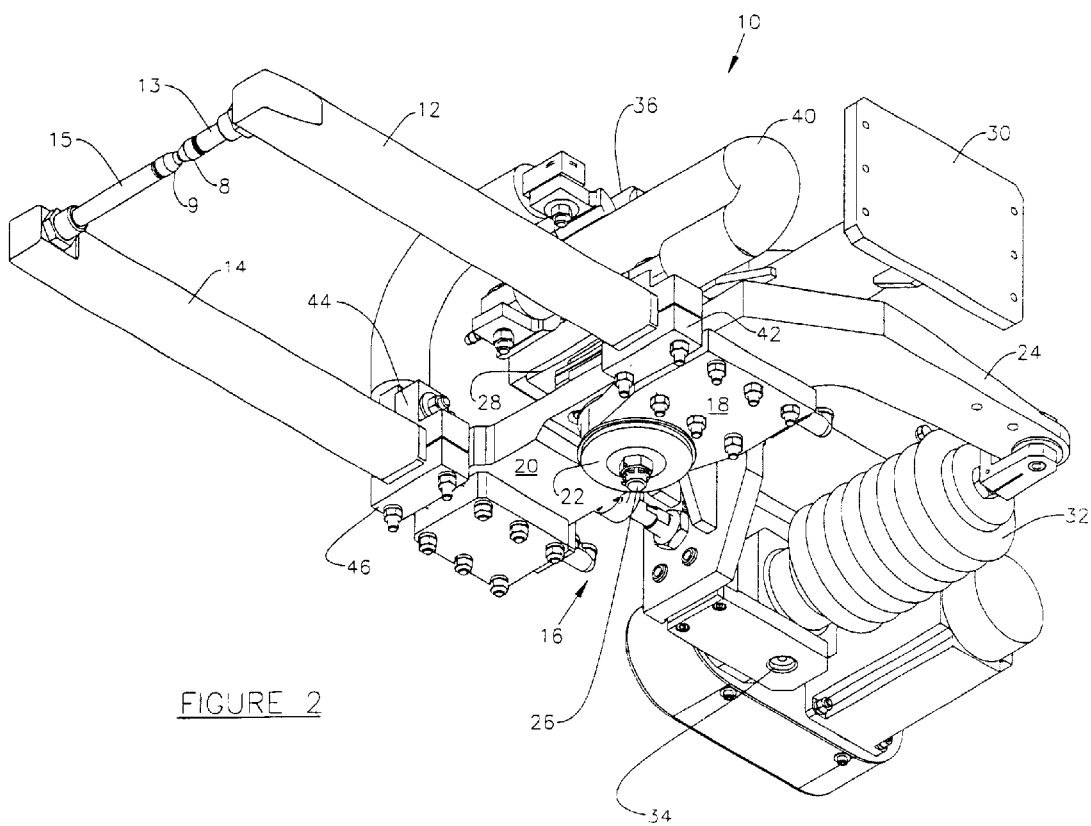
FIG. 2 is a perspective view of the weld gun of FIG. 1 showing the opposite side.
Figure 3:
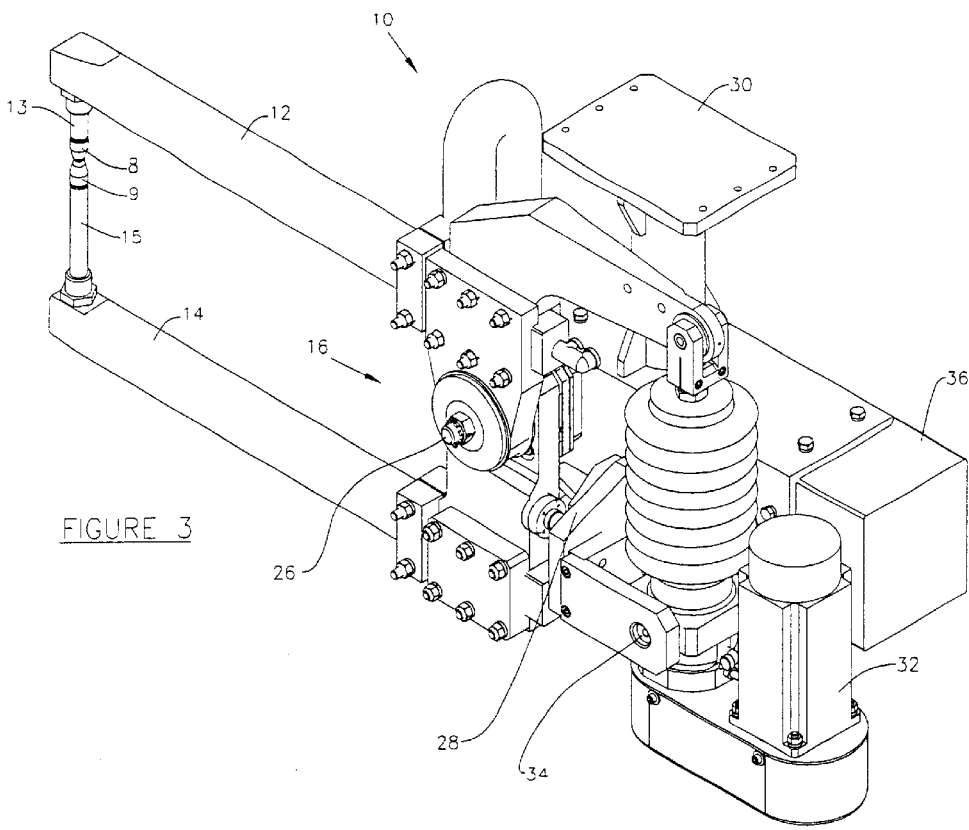
FIG. 3 is yet another perspective view of the weld gun of FIGS. 1 and 2.
Figure 4:
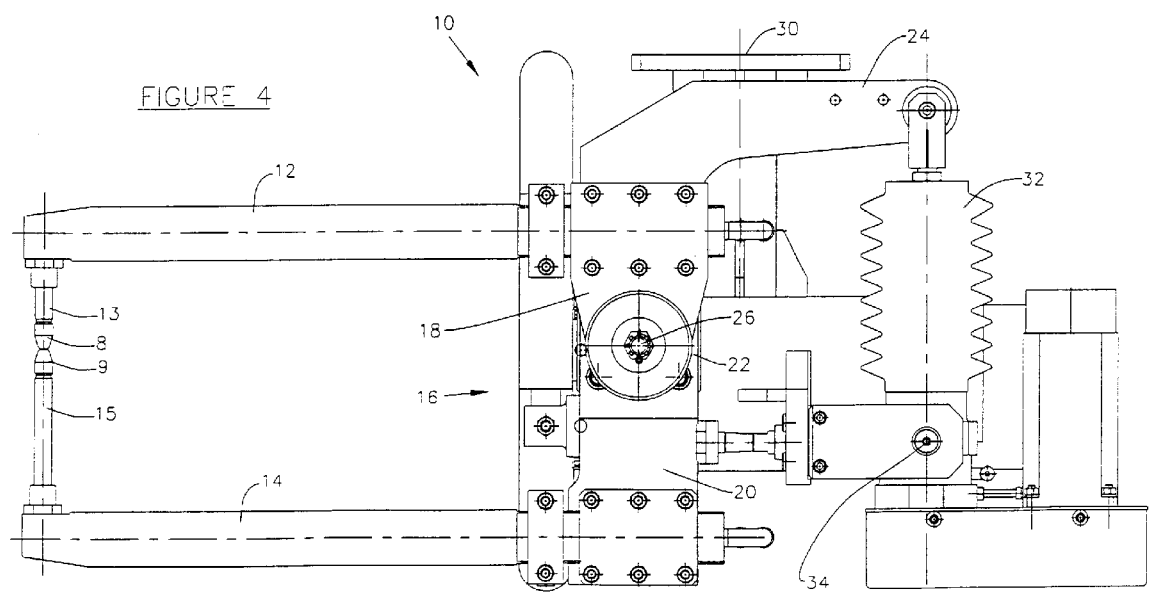
FIG. 4 is a side elevational view of the weld gun of FIGS. 1–3.
Figure 5:
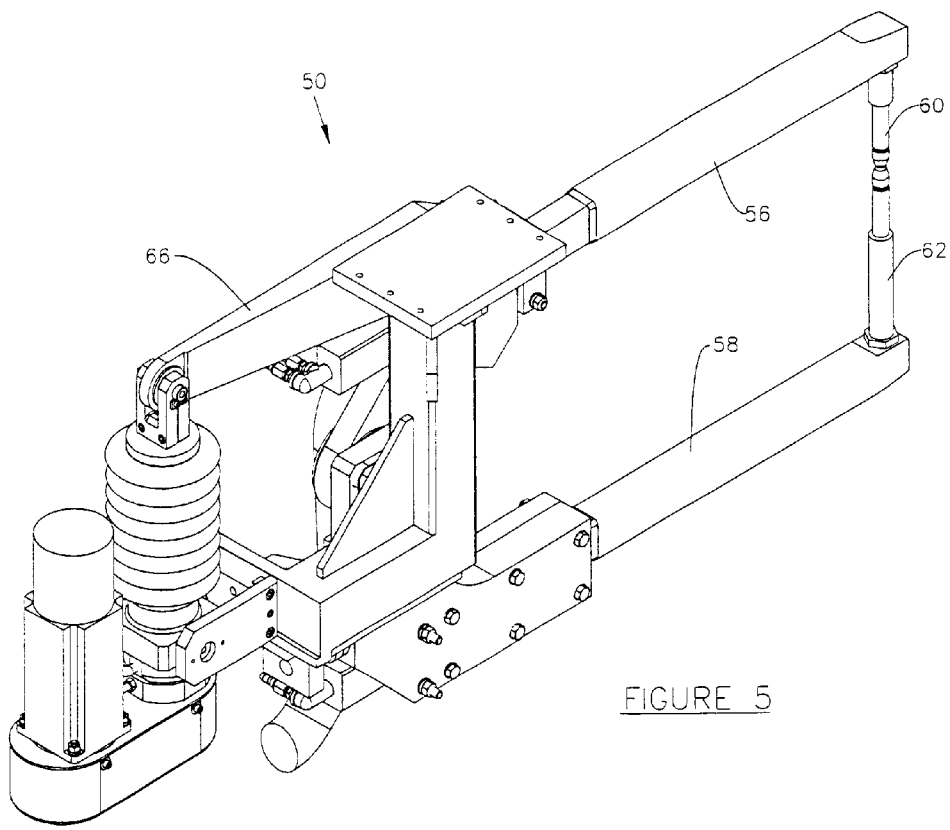
FIG. 5 is a perspective view of a second embodiment of a modular scissors-type servo-actuated welding gun according to the present invention.
Figure 6:
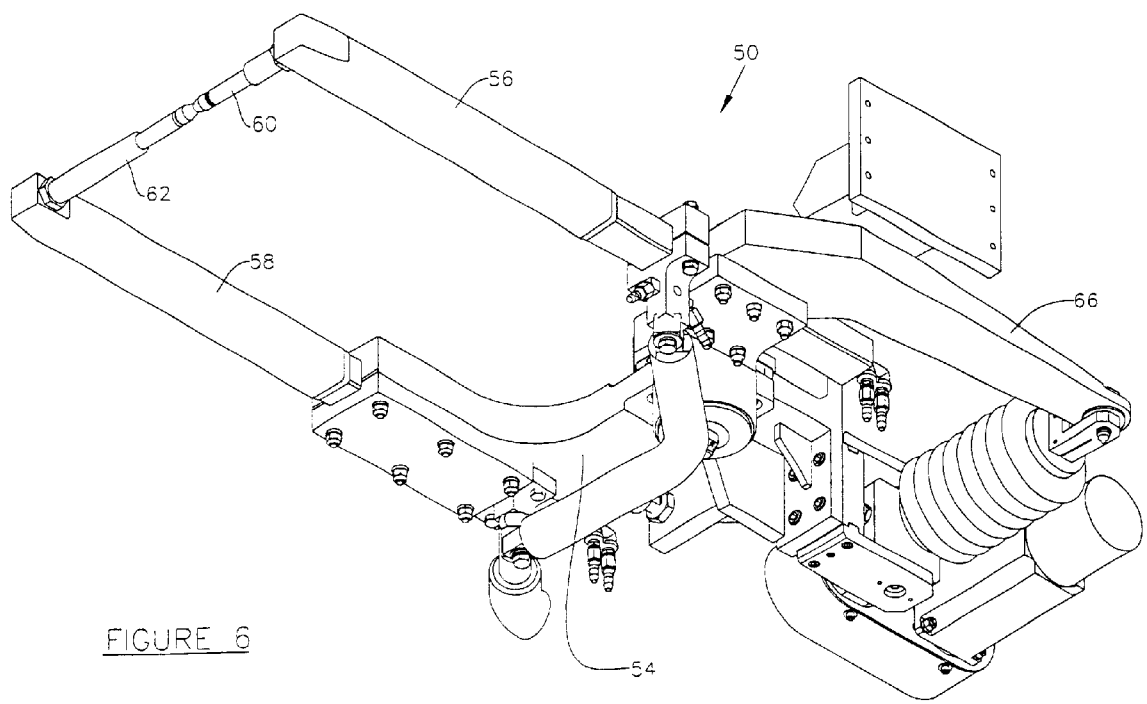
FIG. 6 is a perspective view of the weld gun of FIG. 5 showing the other side.
Figure 7:
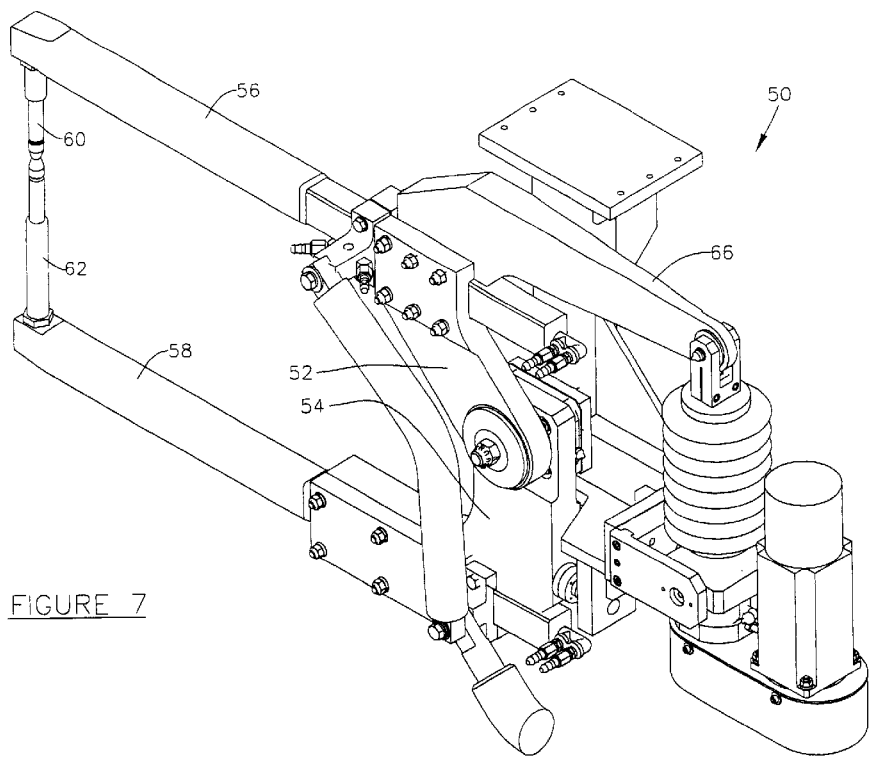
FIG. 7 is yet another perspective of the weld gun of FIGS. 5 and 6.
Figure 8:
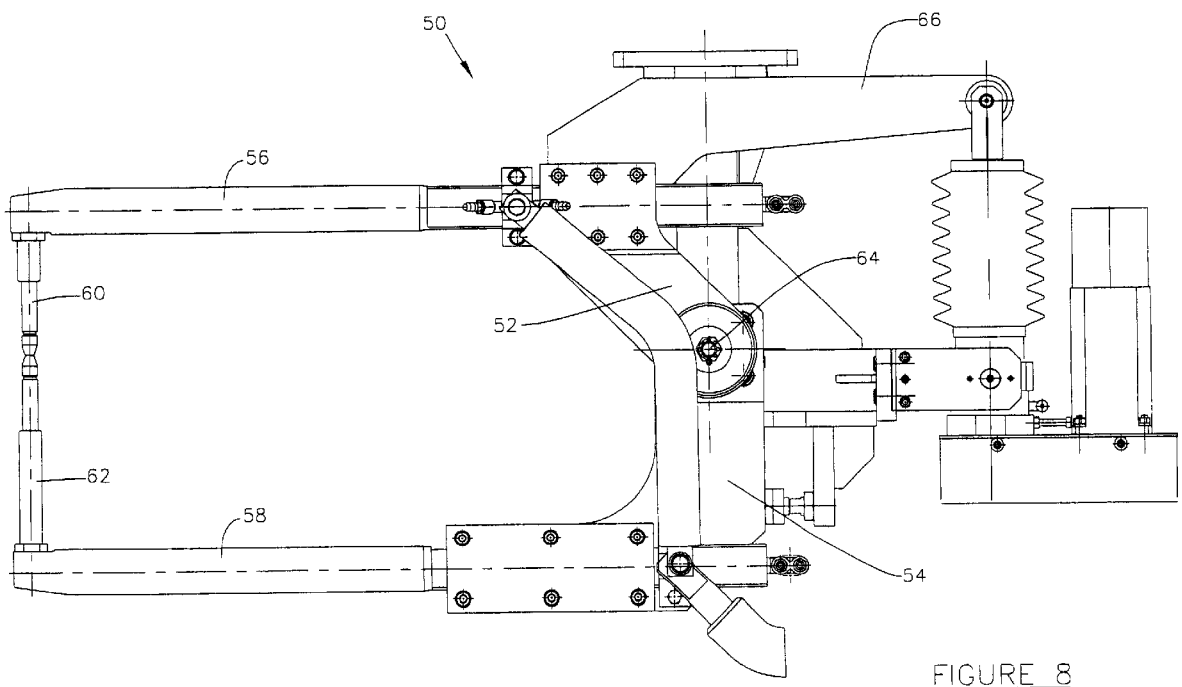
FIG. 8 is a side elevational view of the welding gun of FIGS. 5–7.
Figure 9:
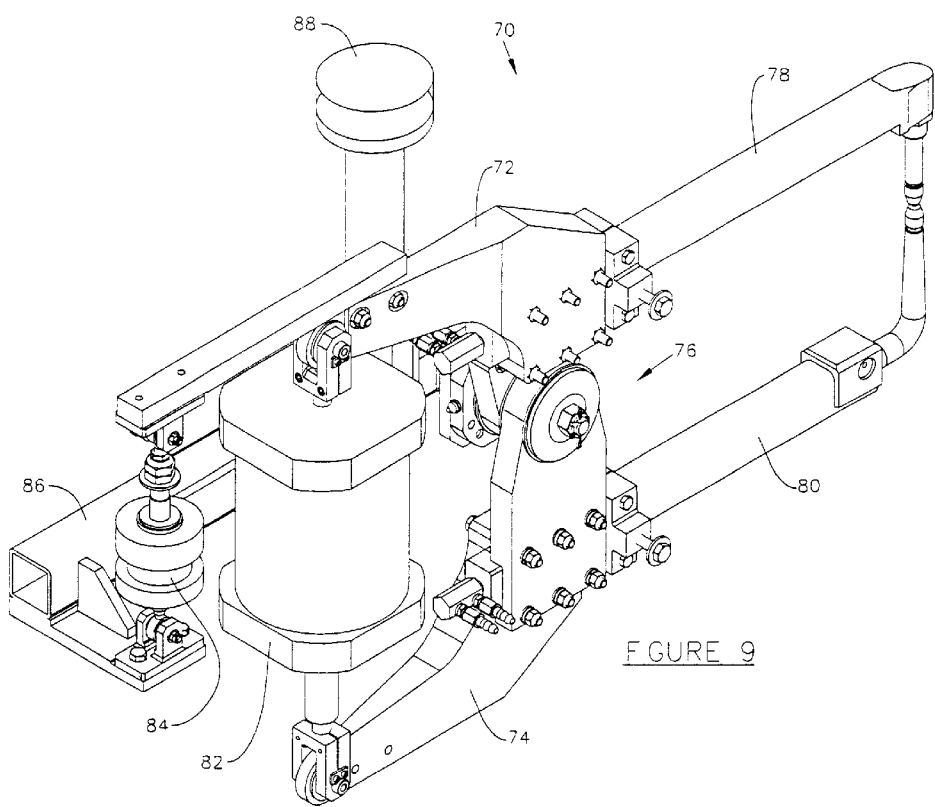
FIG. 9 is a perspective view of the third embodiment of scissors-type welding gun according to the present invention.
Figure 10:
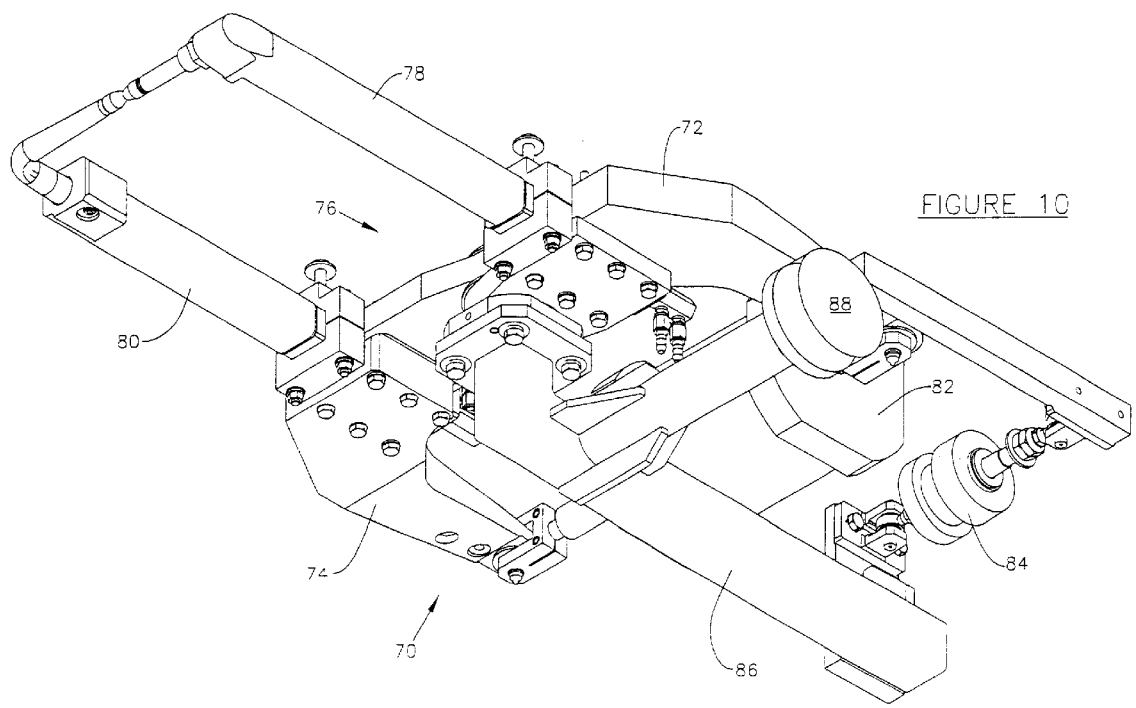
FIG. 10 is a perspective view of the welding gun of FIG. 9 showing the other side.
Figure 11:
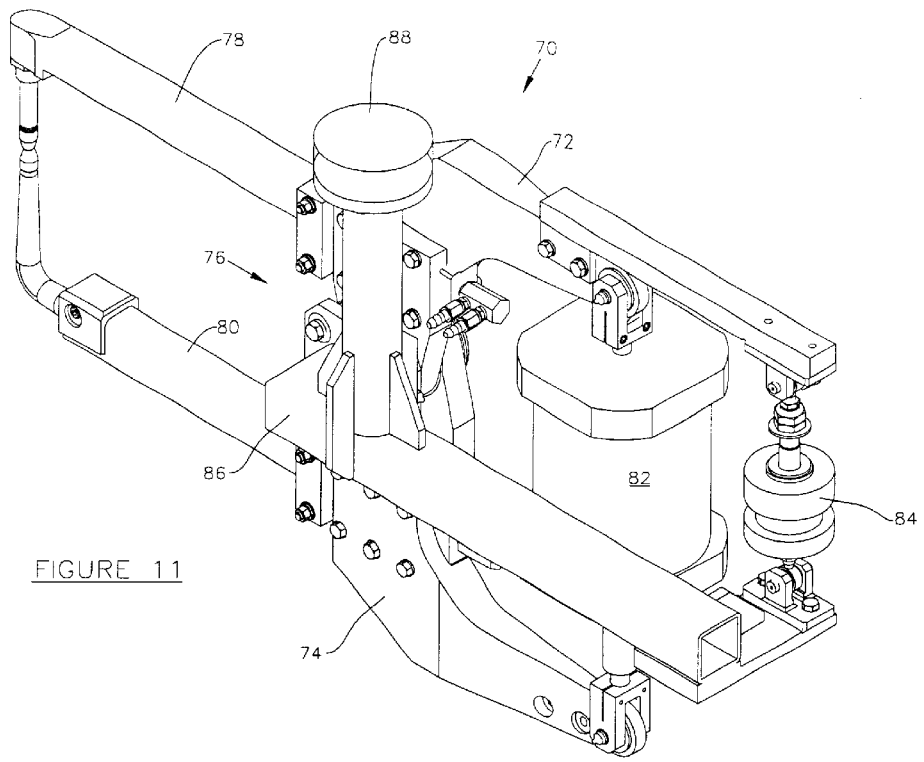
FIG. 11 is yet another perspective of the welding gun of FIGS. 9 and 10.
Figure 12:
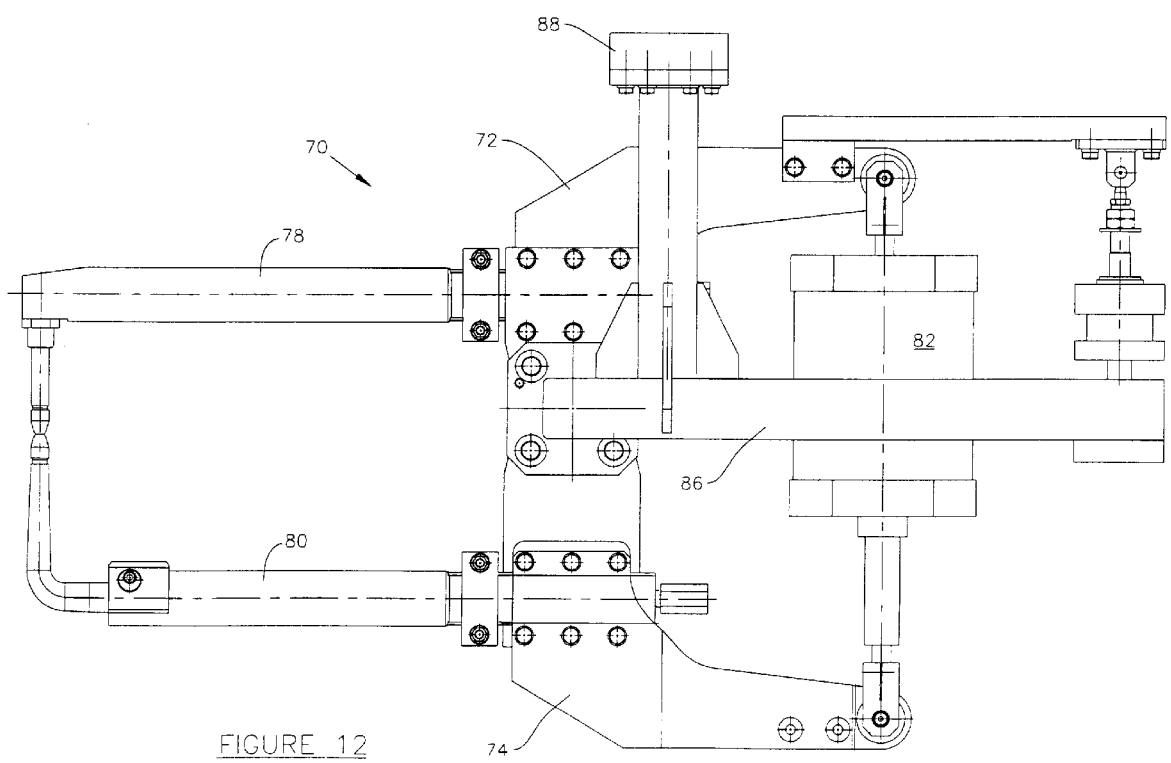
FIG. 12 is a side elevational view of the welding gun of FIGS. 9–11.
Figure 13:
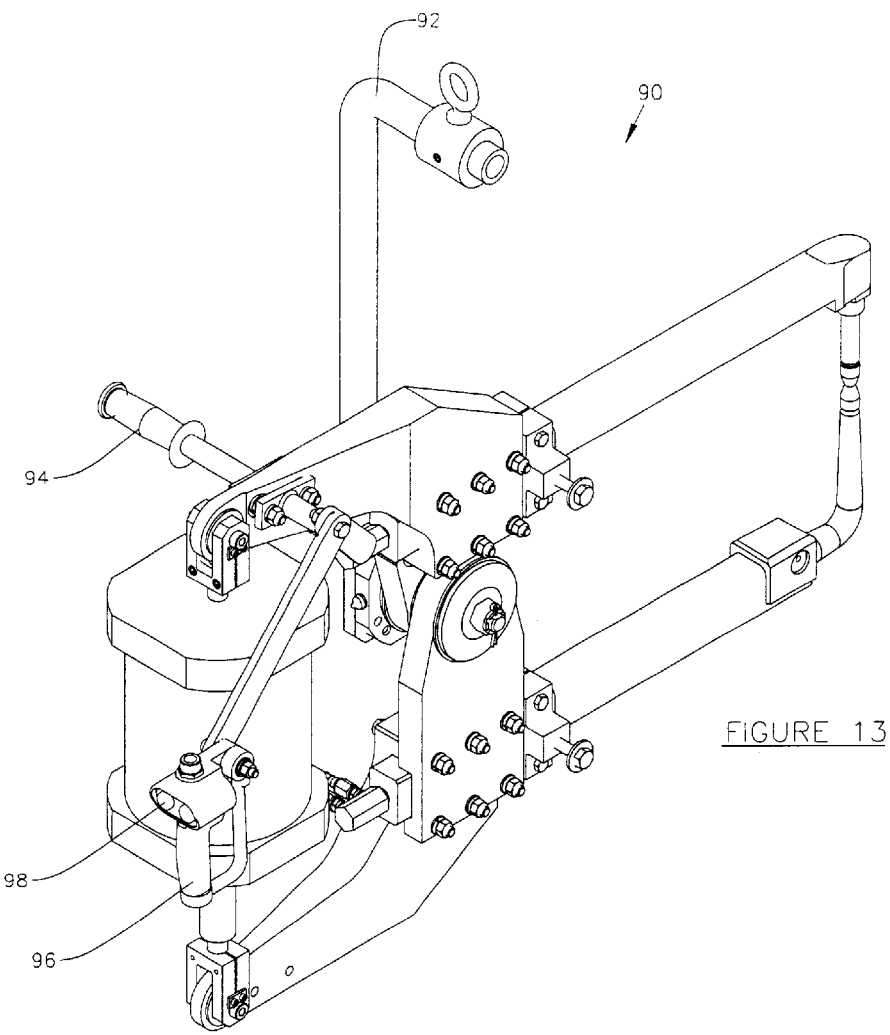
FIG. 13 is a perspective view of the fourth embodiment of welding gun according to the present invention.
Figure 14:
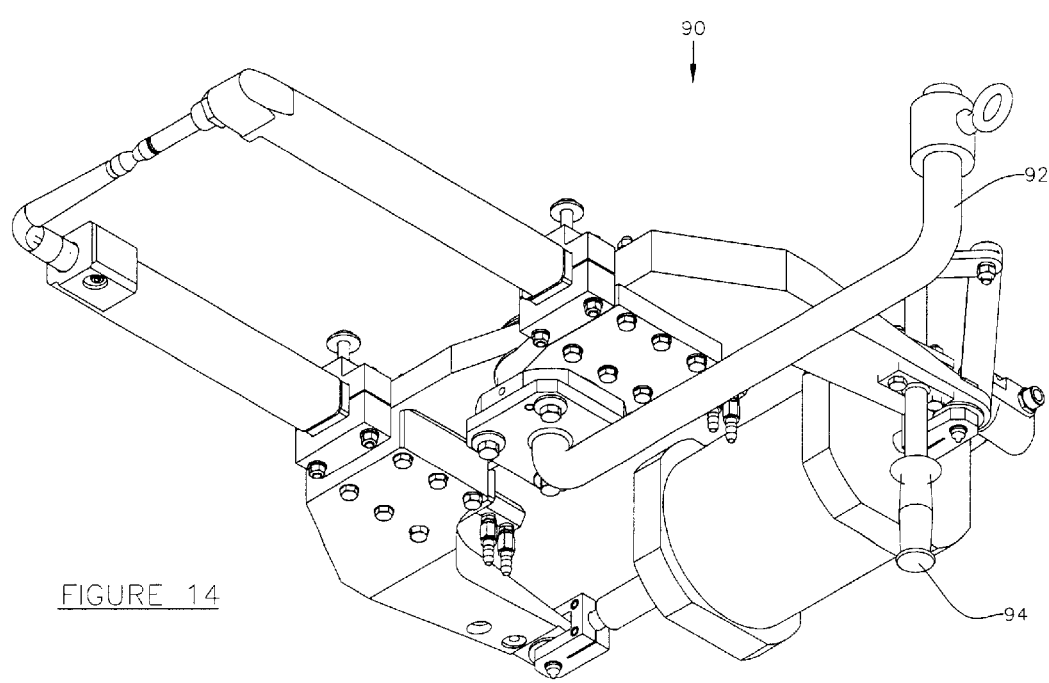
FIG. 14 is a perspective view of the welding gun of FIG. 13 showing the other side.
Figure 15:
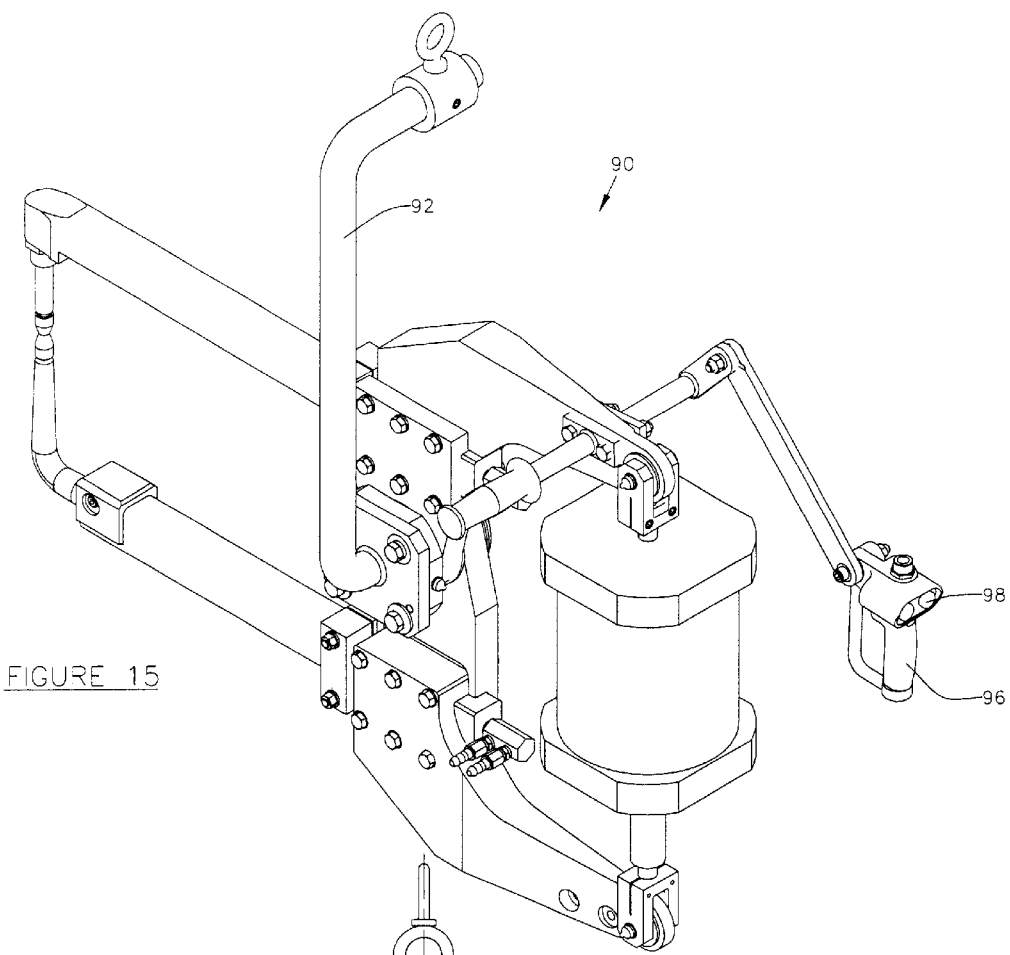
FIG. 15 is a yet another perspective of the welding gun of FIGS. 13 and 14.
Figure 16:
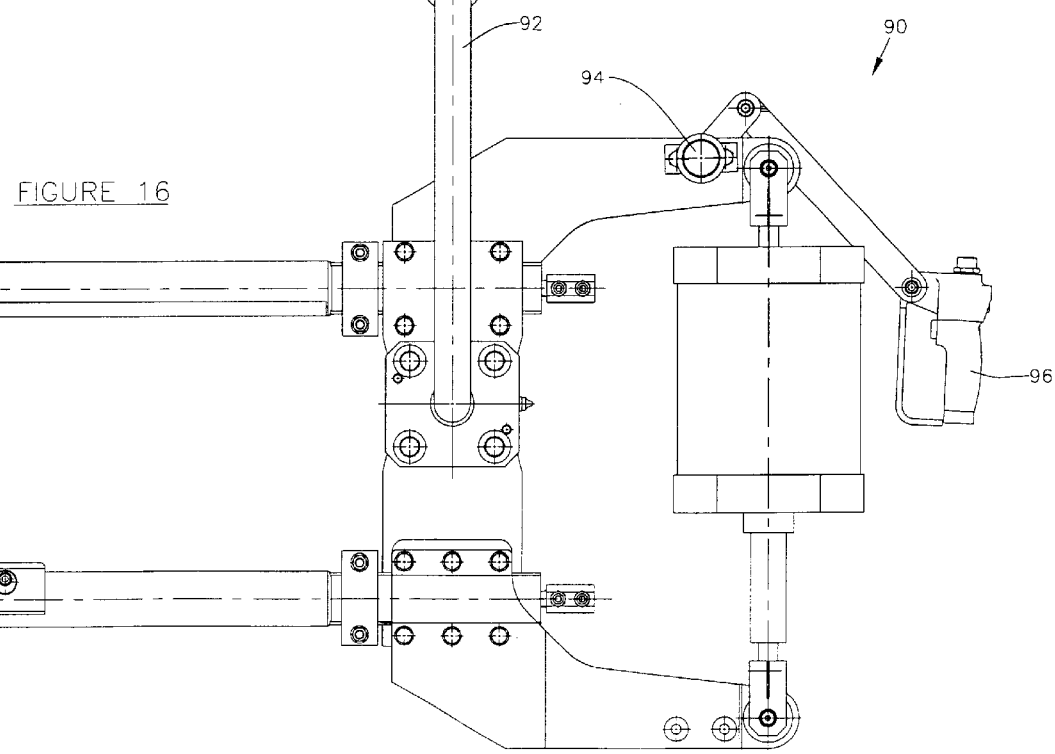
FIG. 16 is a side elevational view of the welding gun of FIGS. 13–15.
Figure 17:
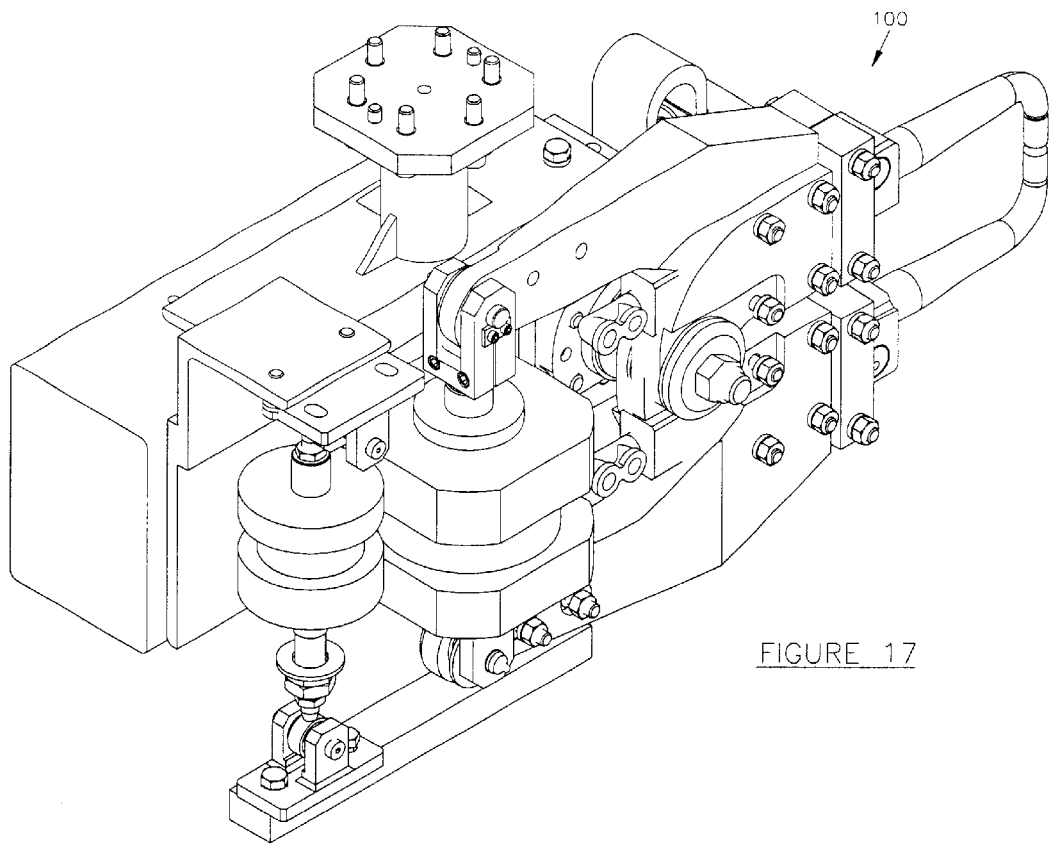
FIG. 17 is a perspective view of the fifth embodiment of welding gun according to the present invention.
Figure 18:
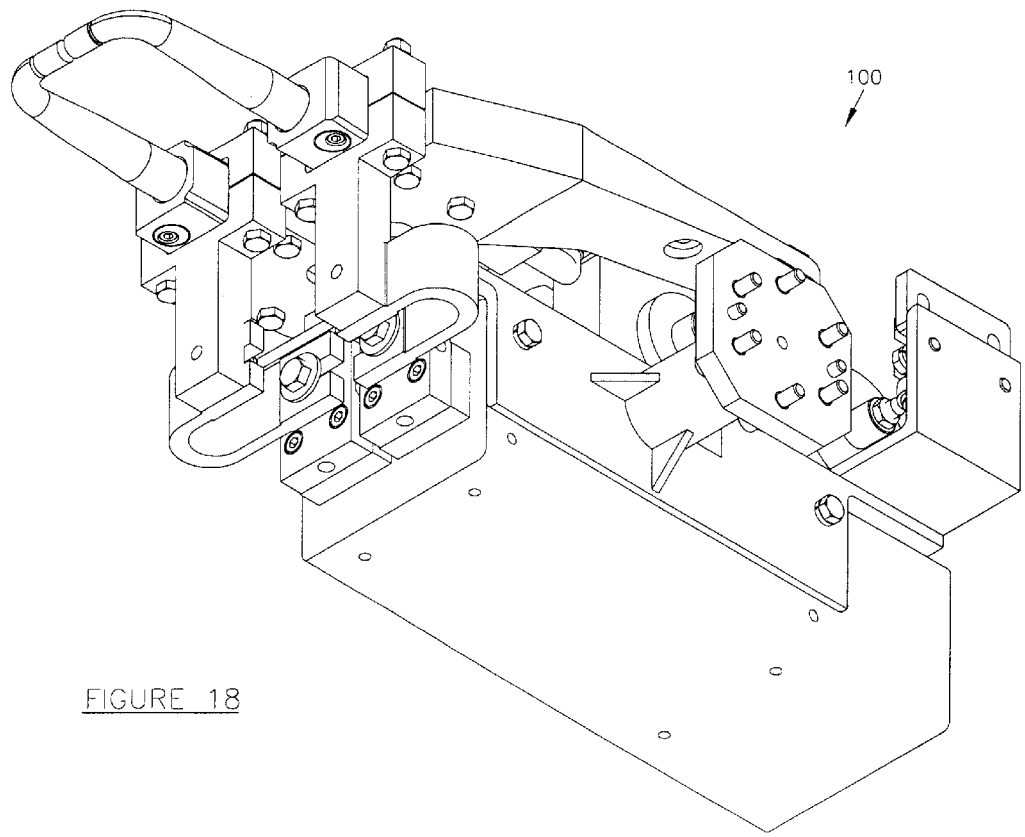
FIG. 18 is a perspective view of the welding gun of FIG. 17 showing the other side.
Figure 19:
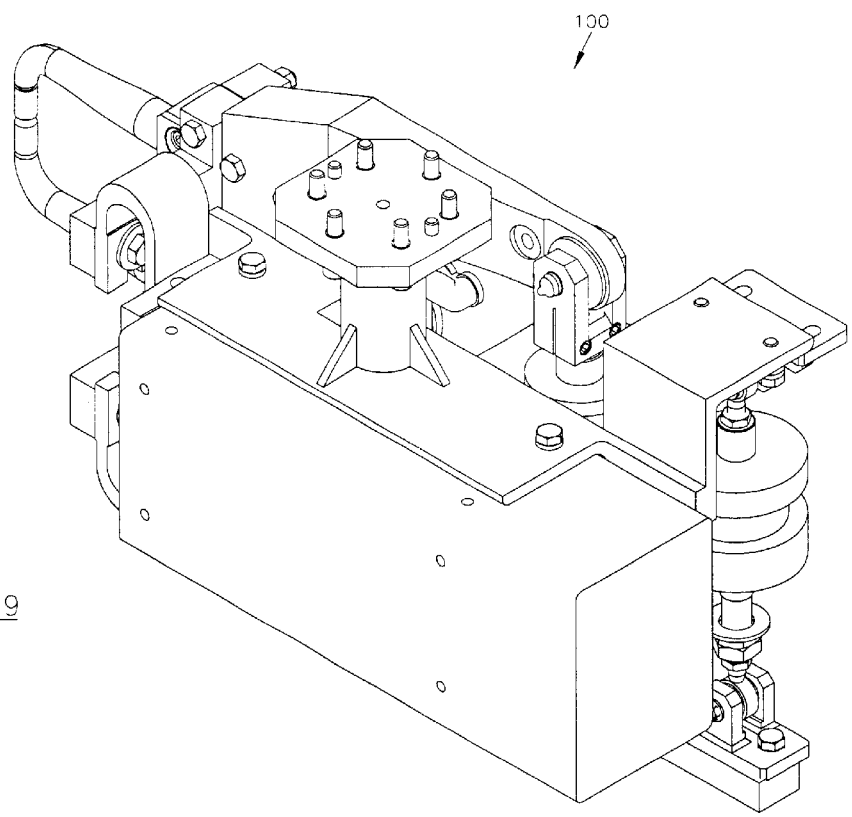
FIG. 19 is a yet another perspective of the welding gun of FIGS. 17 and 18.
Figure 20:
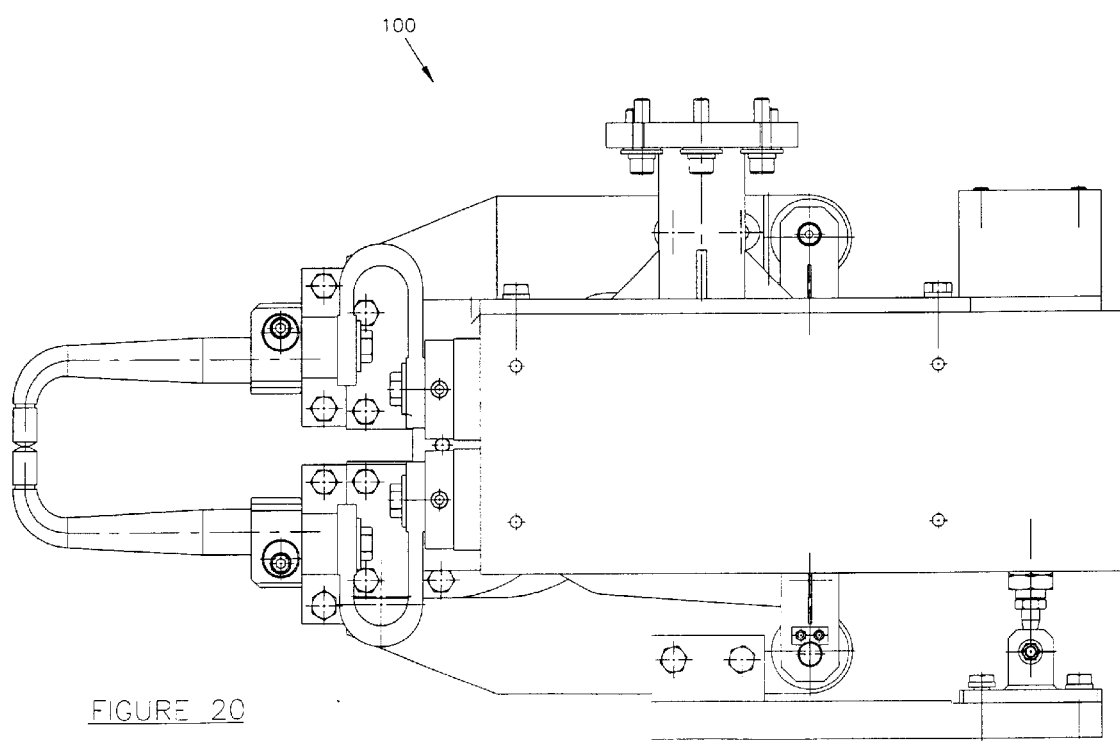
FIG. 20 is a side elevational view of the welding gun of FIGS. 17–19.
Figure 21:
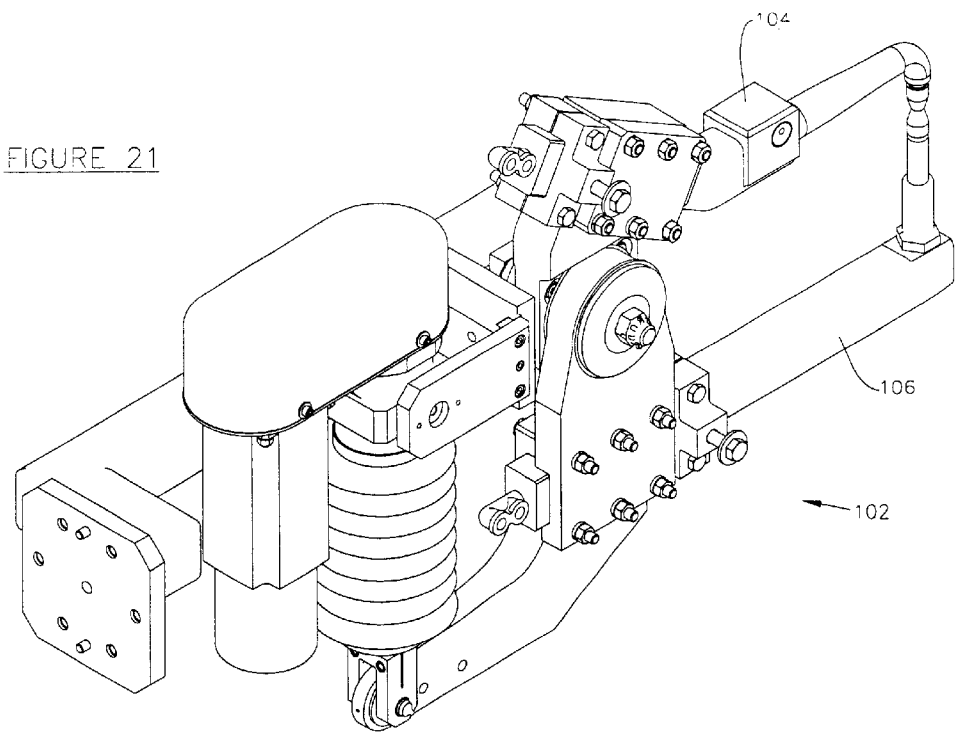
FIG. 21 is a perspective view of the sixth embodiment of welding gun according to the present invention.
Figure 22:
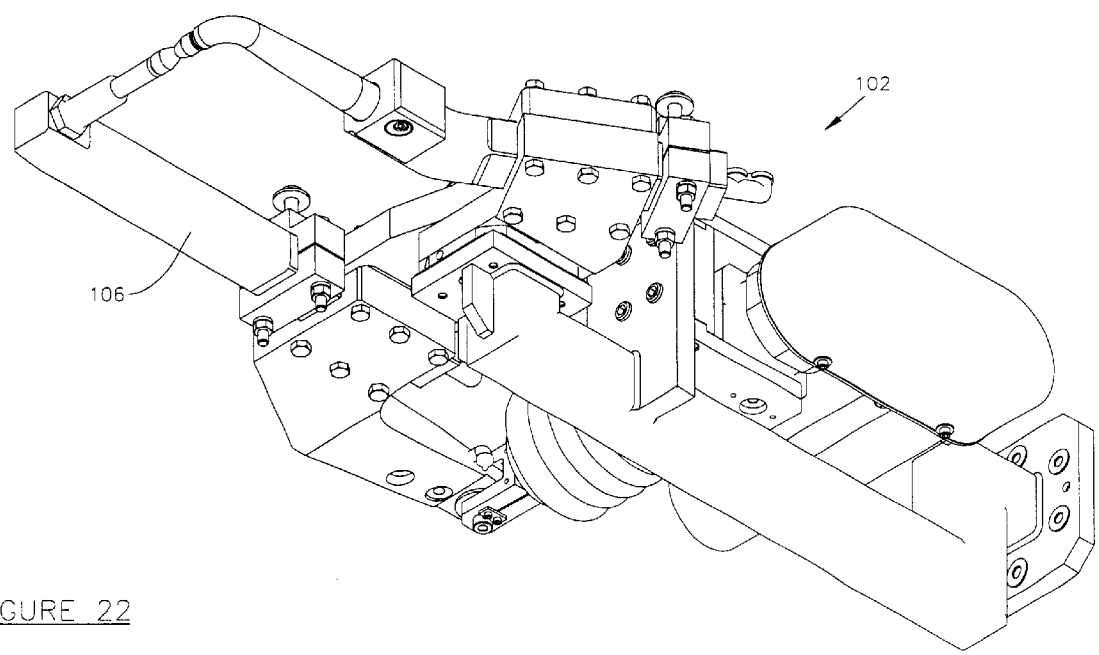
FIG. 22 is a perspective view of the welding gun of FIG. 21 showing the other side.
Figure 23:
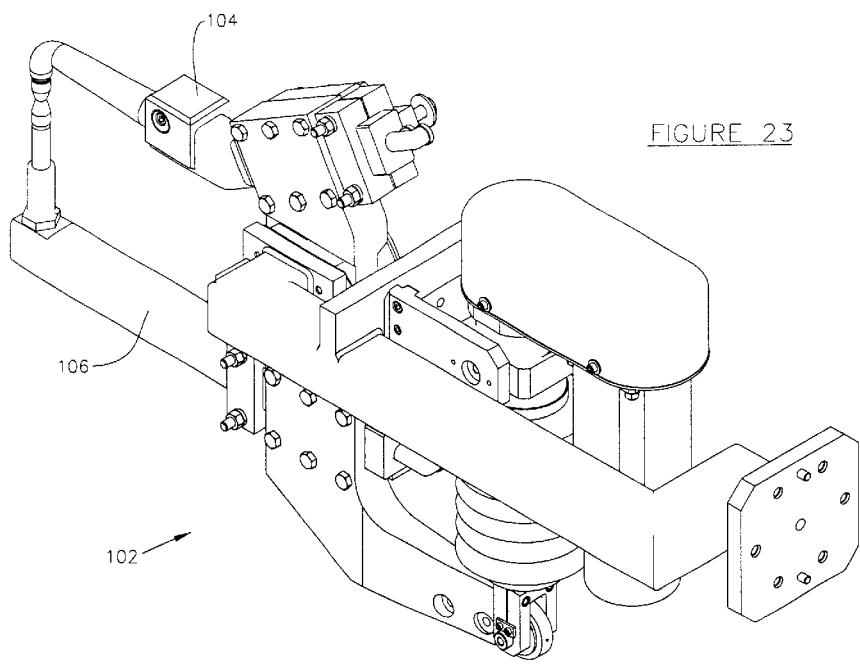
FIG. 23 is a yet another perspective view of the welding gun of FIGS. 21 and 22.
Figure 24:
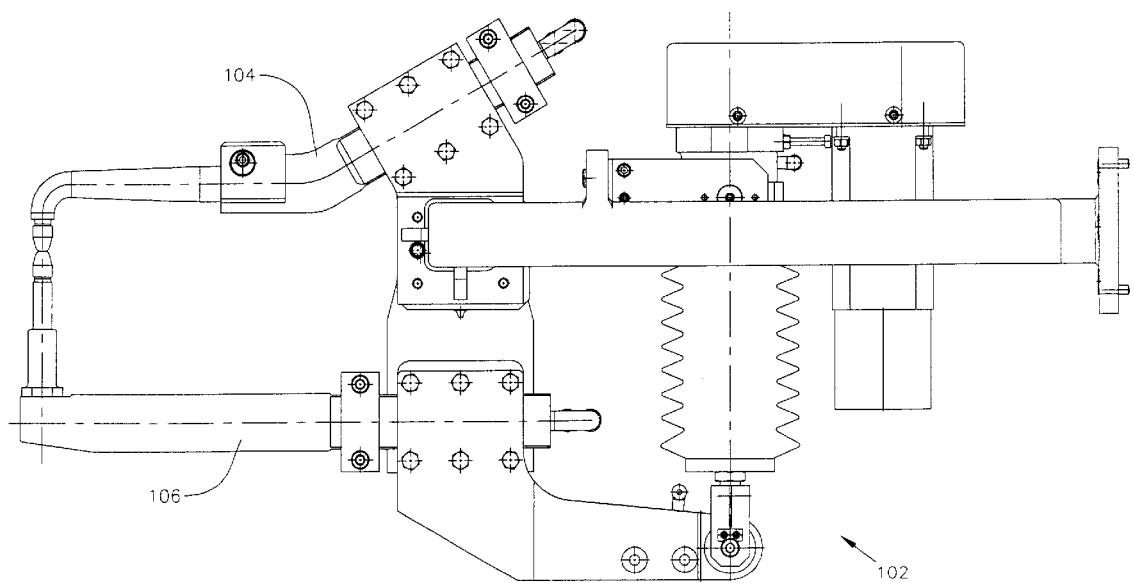
FIG. 24 is a side elevational view of the welding gun of FIGS. 21–23.

Obviously, in order to weld using the welding gun of FIGS. 1–4, electrical current must be conducted to or from the electrodes 13 and 15. As best shown in FIG. 2, a flexible shunt 40 interconnects the upper weld arm 12 with the transformer 36. A modular shunt clamp 42 bolts to the upper weld arm adjacent the upper yoke 18 and interconnects with the flexible shunt 40. As will be clear to those of skill in the art, the shunt clamp 42 may be clamped to the upper weld arm 12 at various positions along its length, depending on the application. Because the lower weld arm 14 is stationary in this embodiment, a non-flexible shunt 44 extends between the transformer 36 and a second modular shunt clamp 46 which bolts to the lower weld arm 14 adjacent the lower yoke 20. In this embodiment, the modular weld arms 12 and 14 are shown as bar stock having a circular cross-section that has been "squared-off" where they bolt to the shunt clamps 42 and 46 in the upper and lower yokes 18 and 20. Alternatively, the weld arms 12 and 14 may have a squared-off cross-section throughout their length.

Referring now to FIGS. 5–8, a second embodiment of a modular scissors type, servo actuated, welding gun is generally shown at 50. This embodiment differs from the previous embodiment in that the yokes 52 and 54 are taller and the weld arms 56 and 58 are longer. This weld gun 50 is adapted for a different application which requires a wider spacing in between the upper and lower arms 56 and 58 and a greater reach between the yokes 52 and 54 and the electrodes 60 and 62. By comparing the first embodiment and the second embodiment, it can be seen that many of the components are the same or similar. That is, each are formed from modular components which may be interchanged in order to change the configuration of the overall assemblies. In the second embodiment, taller yokes 52 and 54 are used and longer pieces of bar stock are used to form the arms 56 and 58. The bearing assembly 64 is similar and the actuator arm 66 is longer. As will be clear to those of skill in the art, components from the first embodiment and second embodiment may be interchanged so as to form other configurations of weld guns. Also, a variety of actuators may be bolted in place of the servo actuators illustrated so that the weld guns may work with other systems. Another difference between the second weld gun 50 and the first weld gun 10, is that the second weld gun 50 is designed to use a remote transformer, not shown, instead of one mounted to the gun. The necessary shunts for interconnecting with the transformer are not illustrated in these Figures.

Referring now to FIGS. 9–12, a third embodiment of a weld gun according to the present invention is generally shown at 70. This embodiment is similar to the previous embodiments in that it is constructed from modular components to make a complete working assembly. However, it differs in that it includes a pneumatic actuator rather than a servo actuator. Therefore, both an upper actuator arm 72 and a lower actuator arm 74 extend rearwardly from the fulcrum assembly 76 that pivotally interconnects the upper weld arm 78 and the lower weld arm 80. A pneumatic cylinder 82 is disposed between the ends of the upper and lower actuator arms 72 and 74 so that when the cylinder 82 is actuated and extended, as shown, the actuator arms 72 and 74 are spread apart causing the welding arms 78 and 80 to be pushed together. Once again, as will be clear to those of skill in the art, many of the same components are used to construct this gun as in the previous embodiments. Because this gun 70 includes a pneumatic actuator, it also includes a positioning cylinder 84 which mounts between the frame 86 and an extension to the upper actuator arm 72. The positioning cylinder 84 is used to position the upper weld arm 78 relative to the frame 86 so that a robot, to which the gun 70 is mounted, may position the upper welding arm in a known position. Otherwise, the robot is unable to determine the exact positions of the upper and lower electrodes relative to the frame. This embodiment also is designed for use with a remote transformer and includes a robot mount 88 for mounting the gun to a robot.

Referring now to FIGS. 13–16, a fourth embodiment of a weld gun according to the present invention is generally shown at 90. This embodiment is similar to the third embodiment except that it is adapted to be a portable weld gun. For this reason, it includes a support member 92 so that the weld gun 90 may be hung from a welder support. It also includes handles 94 and 96 with controls 98 so that an operator may manually control the weld gun. Also, because the gun is designed for portable use, it does not have a positioning cylinder. Once again, the gun 90 is constructed from a variety of modular components to create a complete operating assembly.

Referring now to FIGS. 17–20, a fifth embodiment of a modular weld gun according to the present invention is generally shown at 100. This gun 100 is a further example of a weld gun constructed from modular components. In this embodiment, smaller and shorter weld arms are used and the yokes are more compact. This embodiment includes a pneumatic actuator and a positioning cylinder and an integral transformer.

Referring now to FIGS. 21–24, a sixth embodiment of a modular weld gun according to the present invention is generally shown at 102. Like the earlier embodiments, this embodiment is formed from a variety of modular components. Unlike the earlier embodiments, the upper weld arm 104 is bent so as to suit a different application. Also, this gun is configured such that the lower weld arm 106 is the arm which moves rather than the upper arm 104. This embodiment again illustrates the benefits of the present invention which are realized by the combination of modular components. To provide the different configuration, similar components are assembled in a different manner. Also, the bar stock upper arm 104 provides the benefit that the arm may be bent to the configuration necessary. If later a straight upper arm is desired, the bent upper arm 104 may be unbolted and replaced with a different configuration. This is a benefit to all the configurations in that components may be unbolted for replacement as necessary to maintain or reconfigure the gun.

Figure 25:
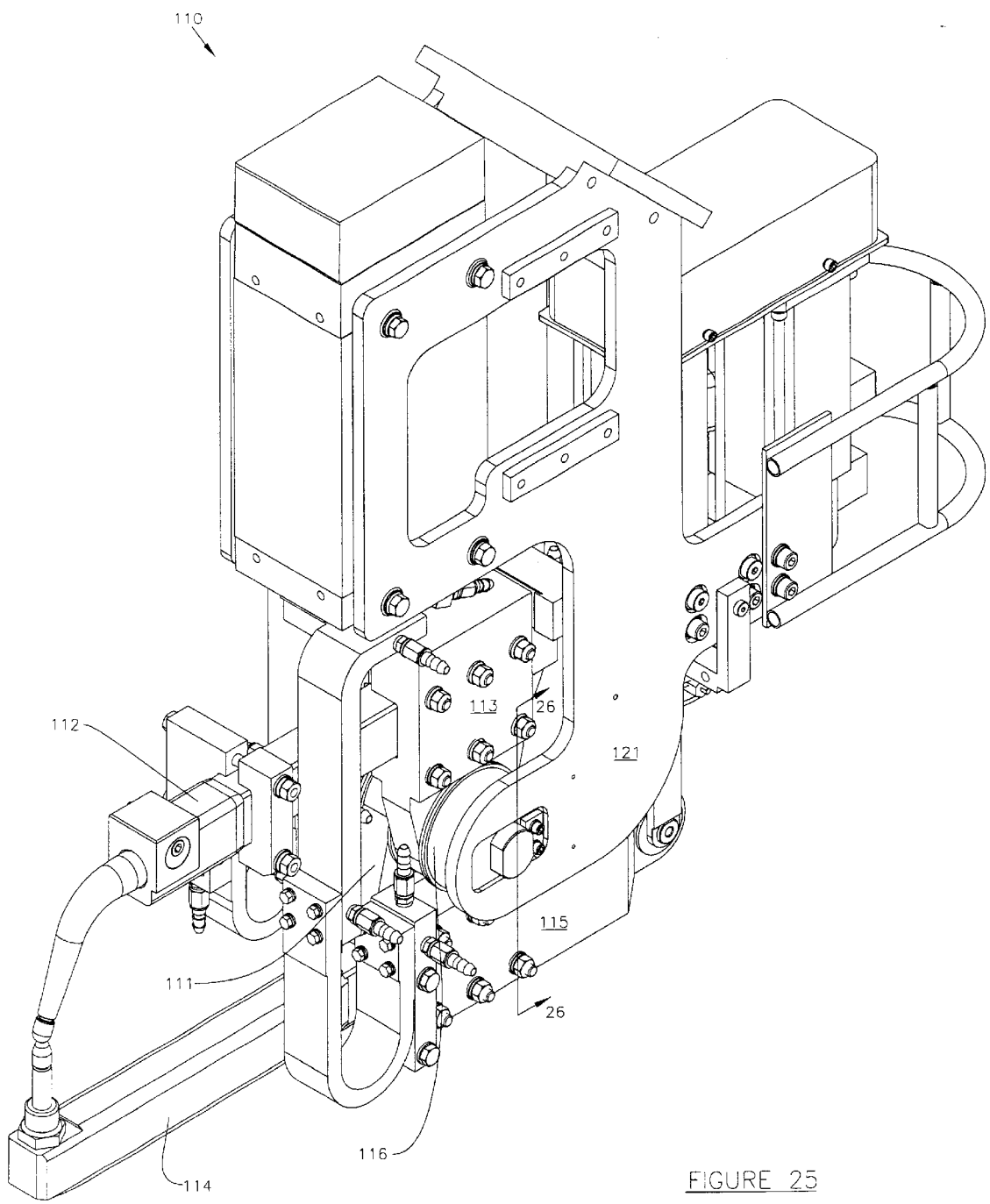
FIG. 25 is a perspective view of the seventh embodiment of welding gun according to the present invention.
Figure 26:
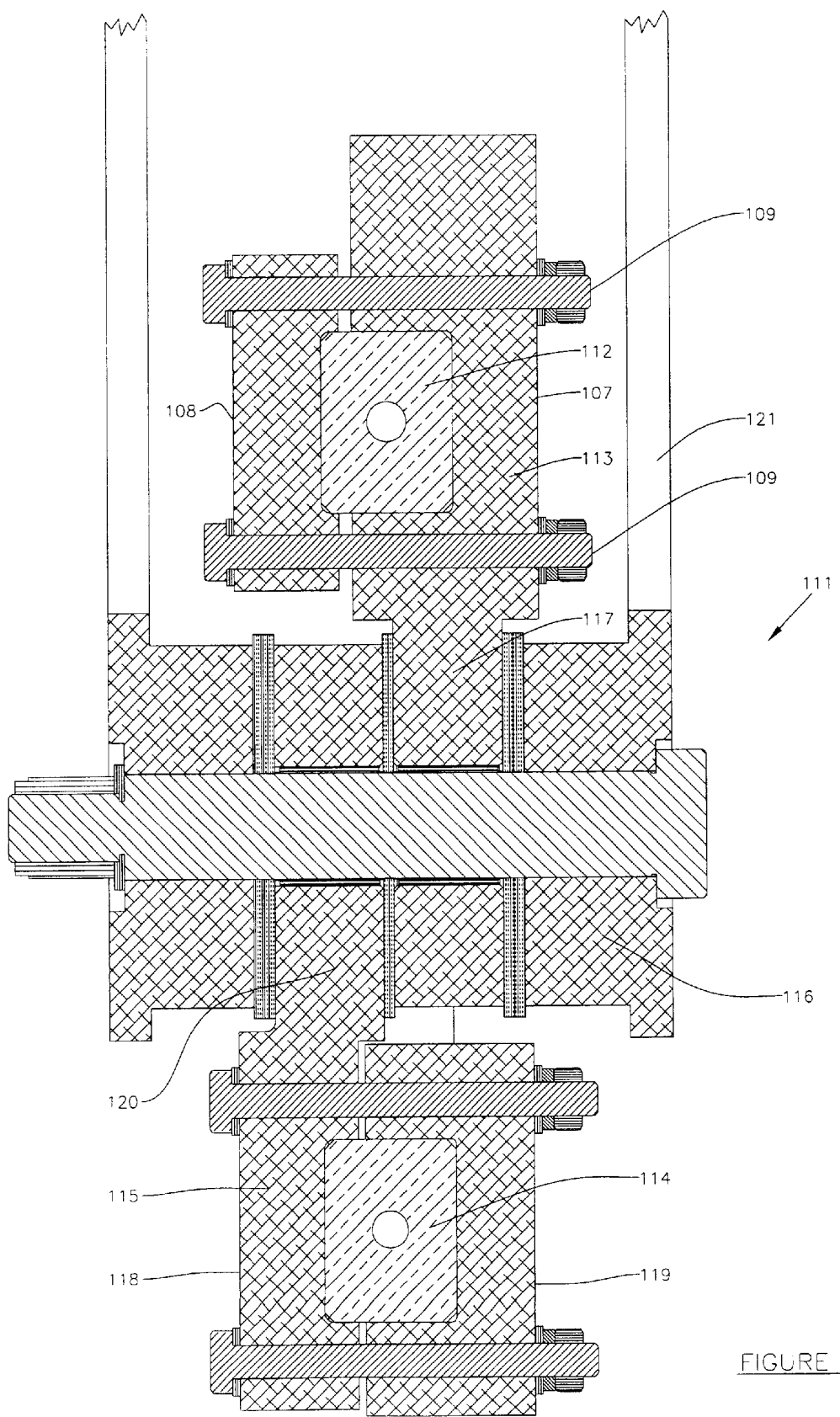
FIG. 26 is a cross-sectional view showing the construction of the bearing assembly and the interconnection between the modular welding arms and the upper and lower yokes, taken along lines 26—26 in FIG. 25.
Figure 29:
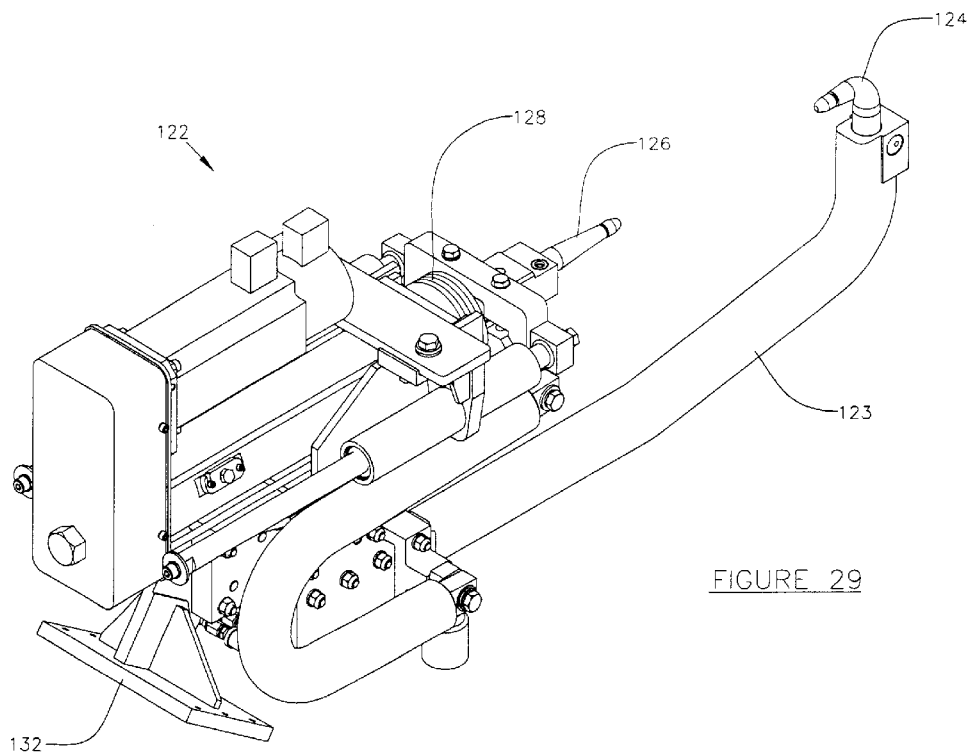
FIG. 29 is an additional perspective of the welding gun of FIGS. 27 and 28.
Figure 30:
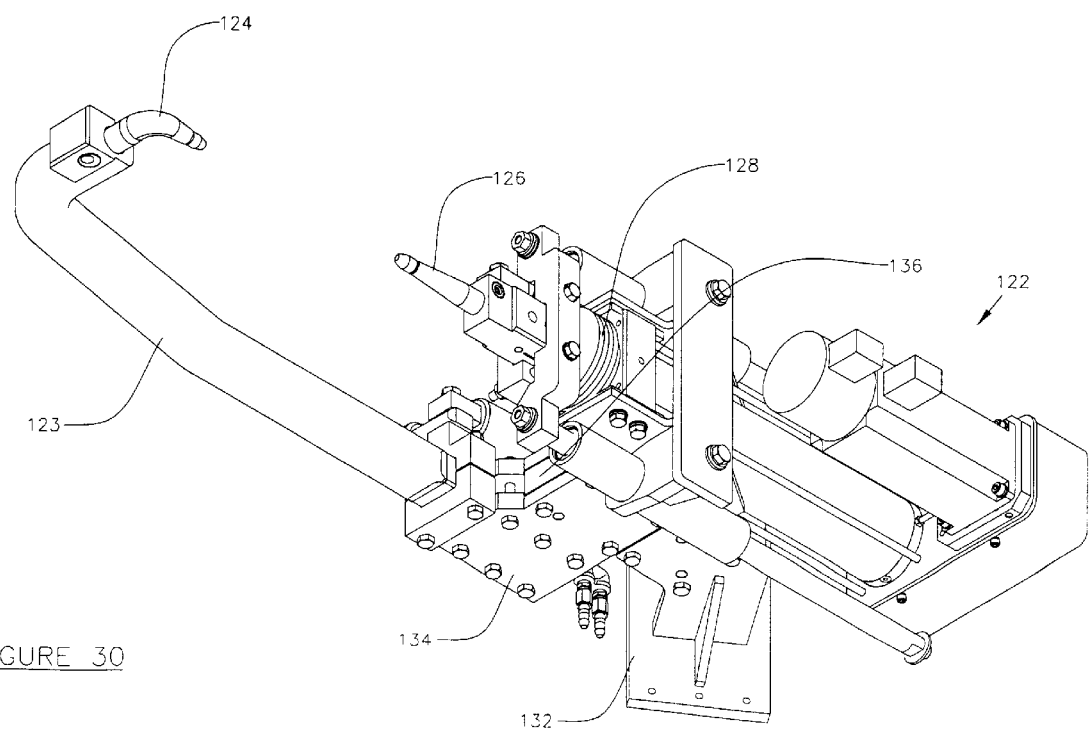
FIG. 30 is yet another perspective view of the welding gun of FIGS. 27–29.
Figure 31:
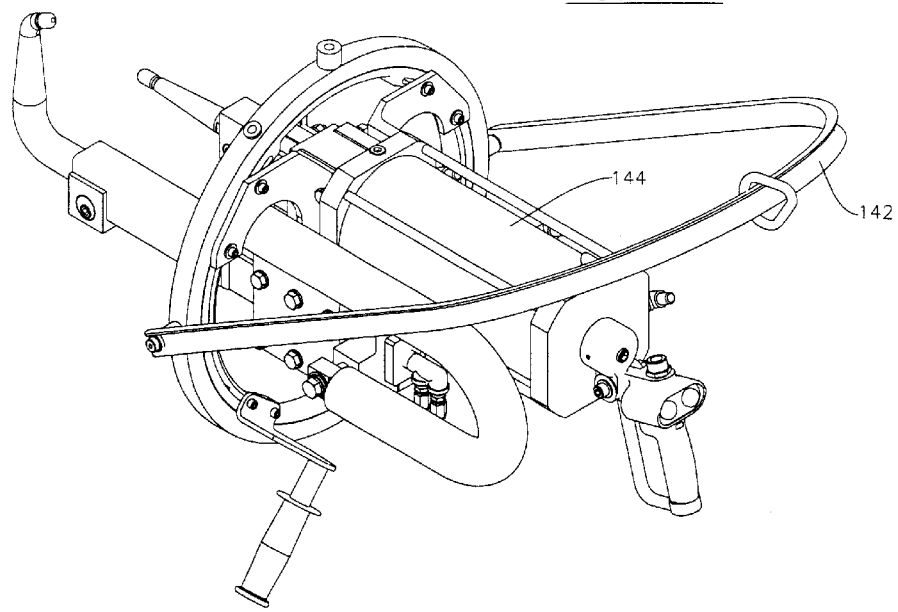
FIG. 31 is a perspective view of the ninth embodiment of welding gun according to the present invention.
Figure 32:
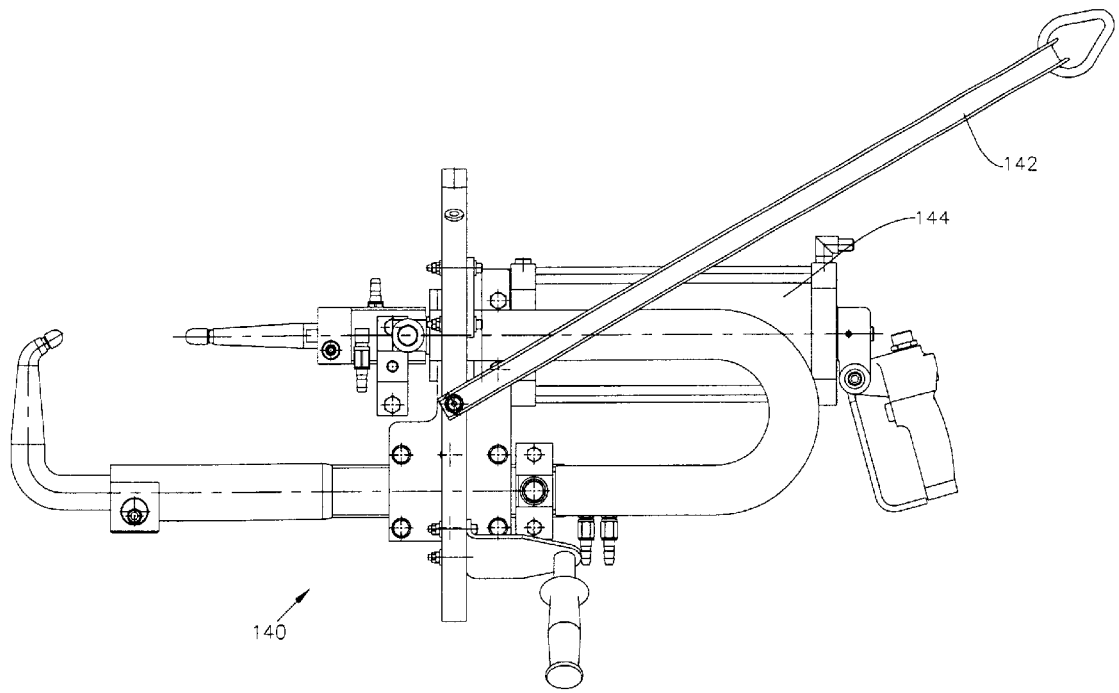
FIG. 32 is a side elevational view of the welding gun of FIG. 31.
Figure 33:
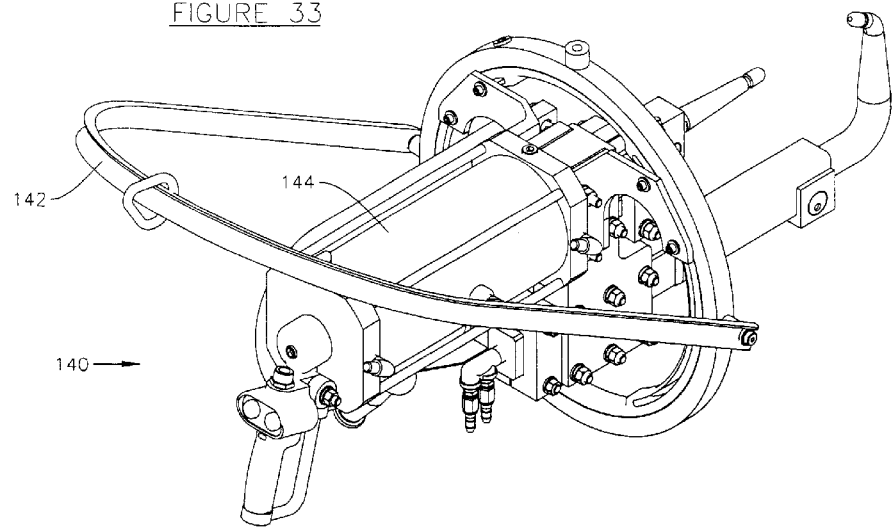
FIG. 33 is another perspective view of the welding gun of FIGS. 31 and 32.
Figure 34:
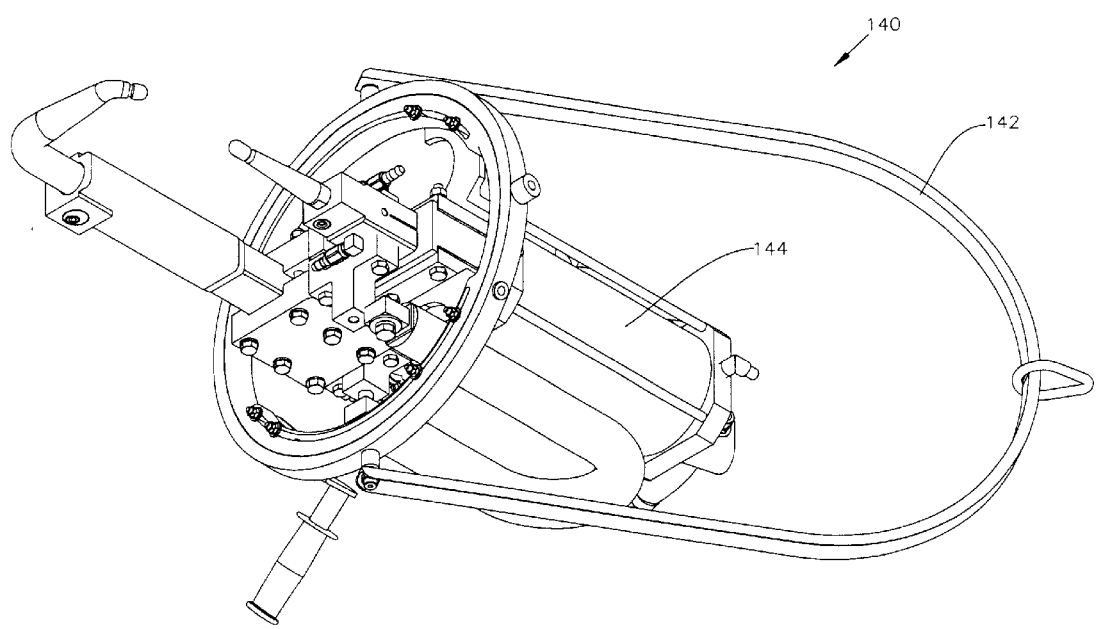
FIG. 34 is yet another perspective view of the welding gun of FIGS. 31–33.
Figure 35:
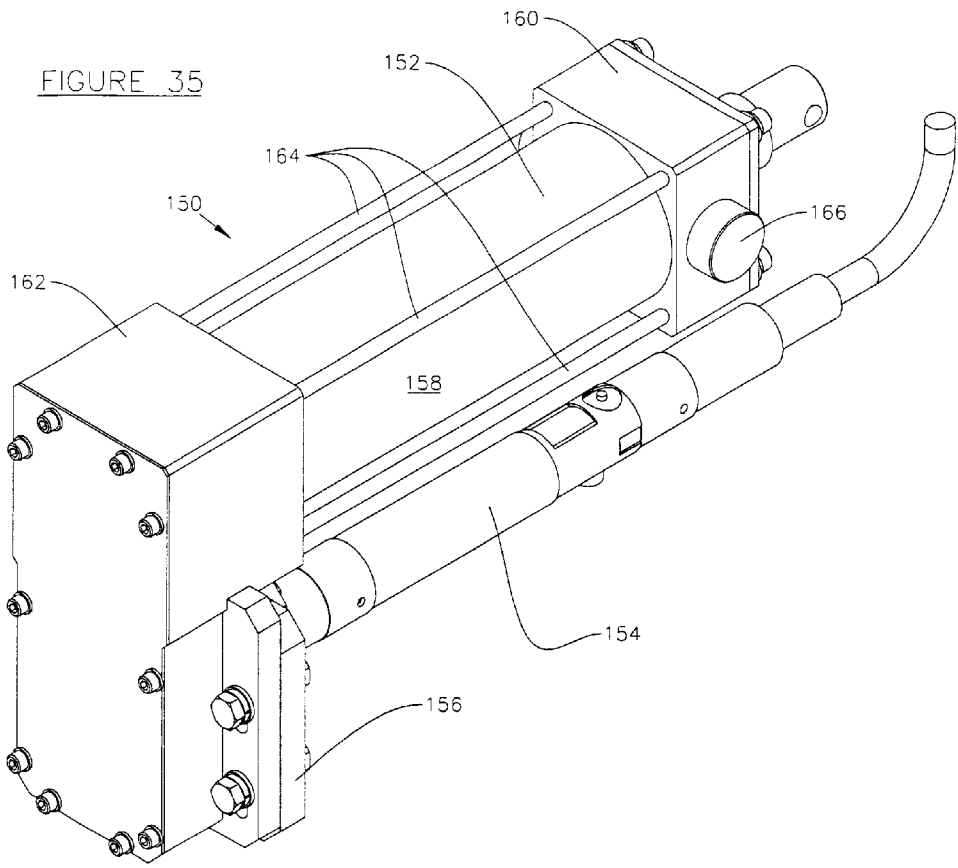
FIG. 35 is a perspective view of a servo actuator according to a further aspect of the present invention.
Figure 36:
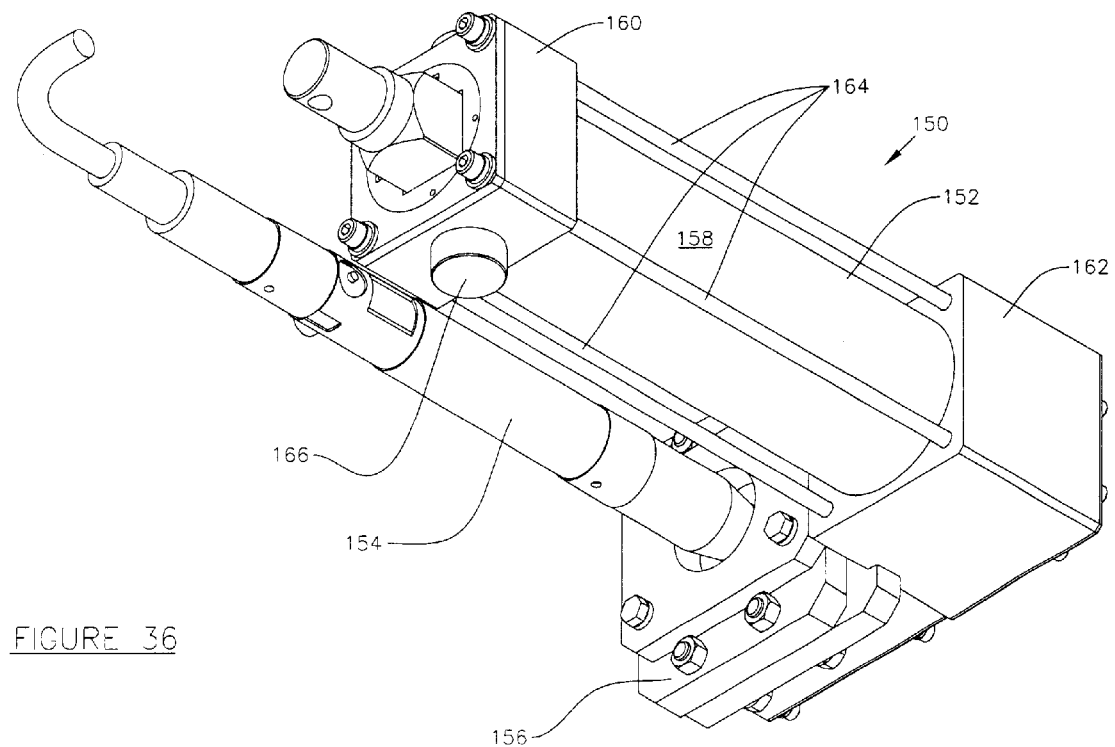
FIG. 36 is an additional perspective view of the servo actuator of FIG. 35 showing the other side.

Referring now to FIGS. 25 and 26, a seventh embodiment of a modular welding gun according to the present invention is generally shown at 110. The welding gun 110 is a scissors-type arrangement having an upper welding arm 112 and a lower welding arm 114 pivotally interconnected by fulcrum assembly 111. The fulcrum assembly includes an upper yoke 113 and a lower yoke 115 and an isolating bearing assembly 116. The entire assembly is supported by a hanger 121 which interconnects with the bearing assembly 116. FIG. 26 is a cross-sectional view showing the construction of the bearing assembly 116 and the upper yoke 113 and lower yoke 115, as well as the interconnection between the yokes and the weld arms. In this embodiment, the weld arms 112 and 114 have generally rectangular cross-sections throughout their length. Alternatively, they may be circular throughout part or all of their length. As shown, the upper yoke 113 includes a front plate 107 and a rear plate 108 which are interconnected by bolts 109. The upper weld arm 112 is clamped between the front and rear plates and preferably nests in recesses defined in the plates. The front plate 107 includes a downwardly extending pivot flange 117 which forms part of the bearing assembly 116. The lower yoke 115 is constructed similarly. Specifically, it has a rear plate 118 and a front plate 119, both with recesses in which the lower weld arm 114 nests. The rear plate 118 has an upwardly extending pivot flange 120 which lays adjacent to the pivot flange 117 of the upper yoke 113. As will be clear to those of skill in the art, the pivot flanges are electrically isolated from one another. However, it can also be seen that they are relatively cantilever to each other to allow for easy disassembly of the bearing assembly 116.

Referring now to FIGS. 27–30, an eighth embodiment of a modular welding gun according to the present invention is generally shown at 122. This type of welding gun is generally referred to in the industry as a "C" or straight action welding gun. It has a lower C-shaped arm 123 that holds an electrode 124. The second electrode 126 is supported by an actuator 128. The actuator 128 moves the second electrode 126 with a "straight action" towards the first electrode 124. This operation is similar to the way in which a C clamp closes by moving one clamping element directly towards an opposite clamping element. The actuator in the illustrated embodiment is a servo, such as with an internal ball screw arrangement, with an external anti-rotate rod 130. However, as will be discussed later, other types of actuators may be used in place of the illustrated actuator.

As with the prior embodiments, the gun 122 is made of modular components with the lower C-shaped weld arm 123 made of bar stock. The gun 122 is designed to be supported by a robot and has a robot mount 132. It is also designed for use with a remotely mounted transformer. Obviously, the modular construction of a straight action welding gun differs from the scissors-type gun discussed earlier. However, similar weld arms such as lower weld arm 123 may be used with either embodiment. In addition, the remainder of the straight action welding gun 122 is bolted together as with the prior embodiment. Specifically, a lower yoke 134 bolts to the lower arm 123 and also interconnects with the frame 136 which supports the actuator 128. As with previous embodiments, the yoke 134 comprises a pair of plates which clamp together with the weld arm 123 trapped therebetween. In this way, the lower arm may be easily unclamped from the yoke 134 and replaced or modified.

Referring now to FIGS. 31–34, a ninth embodiment of a modular weld gun according to the present invention is generally shown at 140. This weld gun 140 is a portable "C" or straight action, pneumatically operated weld gun. Once again, it is assembled from a variety of modular components but differs from the previous embodiment in that it includes a hanger 142 for supporting the portable gun and a pneumatic actuator 144 for moving the electrodes together.

Referring now to FIGS. 35–38, the design of a servo actuator, which represents a further aspect of the present invention, will be discussed. The servo actuator is generally shown at 150. The servo actuator includes the actuator itself 152 and a drive motor 154. The actuator 152 is designed to work with a variety of motors 154 so the illustrated motor is for illustration purposes only. In fact, the actuator 152 includes an adaptor plate 156 that allows the actuator to mount to any of a variety of servo motors. The actuator includes a central cylindrical portion which contains the ball screw actuator. The cylindrical portion 158 is sandwiched between a front housing 160 and a rear housing 162 that are interconnected by tie rods 164. The tie rods 164 act to clamp the actuator together and allow for easy disassembly. The illustrated front housing 160 has trunnion mounts 166 extending from the sides thereof allowing the actuator to be mounted in a trunnion as part of a scissors type weld gun. The front housing 160 may be interchanged with a different front housing that allows a different mounting arrangement. For example, a front housing with mounting holes therein may be provided so that the actuator can be used as part of a straight action gun.

Figure 37:
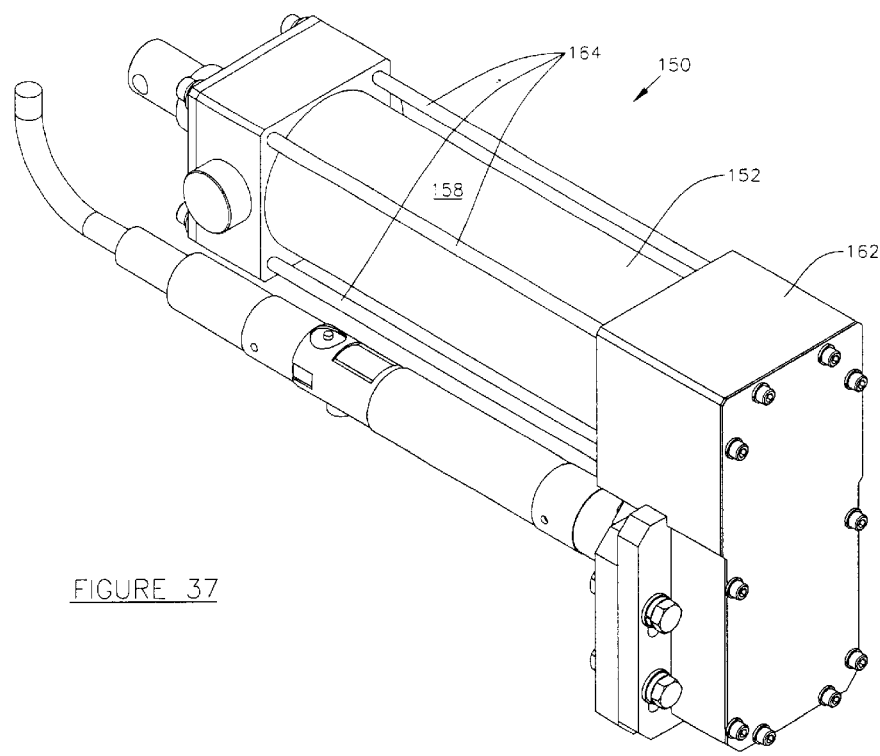
FIG. 37 is yet another perspective view of the servo actuator of FIGS. 35 and 36.
Figure 38:
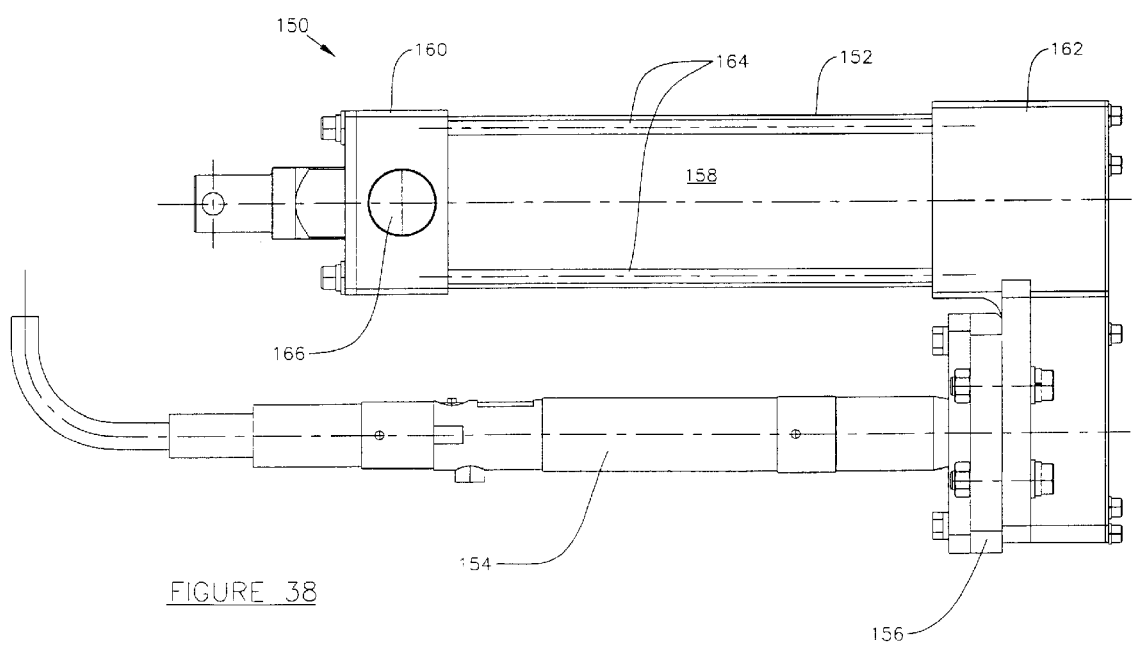
FIG. 38 is a side elevational view of the servo actuator of FIGS. 35–37.

Referring now to FIGS. 39 and 40, the internal workings of the actuator of FIGS. 35–38 will be described in more detail. As shown, the motor 154 turns a drive pulley 168 which in turn rotates a driven pulley 170 via a belt 172. The driven pulley 170 drives a screw 174 which extends through the center of the actuator 152. A nut 176 is supported around the screw 174 and moves forwardly and backwardly as the screw 174 turns. Though not shown, the screw 174 and nut 176 form a ball screw arrangement wherein balls ride in grooves cut into the screw and nut. A square rod 178 mates with the forwardmost end of the nut 176 so that it moves forwardly and backwardly with it. In FIG. 37, the front end of the nut 176 and the rear end of the square rod 178 are shown separated by a short distance for detail. However, in use, the rearward end of the square rod 178 would fit over the front end of the nut 176 so that they move together. Traditional ball screws have problems with the output end of the actuator rotating around the central axis of the ball screw as it moves forwardly and backwardly. As shown earlier in FIGS. 27–30, a ball screw servo actuator may include external anti-rotate features. According to the present invention, the square actuator rod 178 has a square cross-section and passes through a square orifice 180 in the front housing 160. Therefore, the actuator rod 178 just moves inwardly and outwardly and does not rotate about the central axis of the ball screw. As will be clear to those of skill in the art, the actuator end 182 of the square rod 178 may have various configurations based on the needs of the weld gun which it is designed to actuate. However, the present configuration of servo actuator 150 allows for interchangeability of parts making it easier to adapt the actuator to a variety of applications. Also, the square actuator rod 178 avoids the need for external anti-rotate features.

Figure 41:
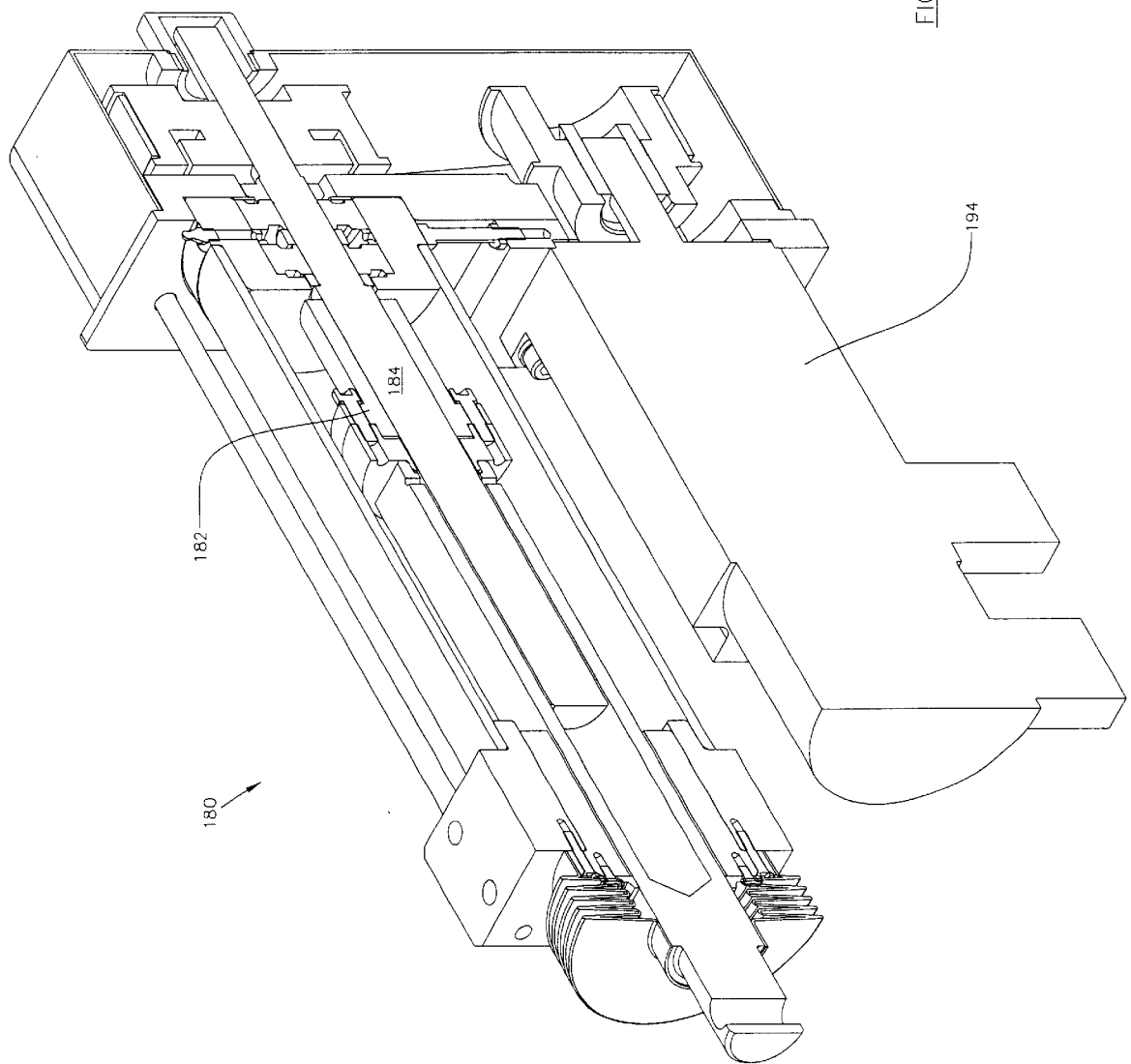
FIG. 41 is a cross-sectional view of an alternative embodiment of a servo actuator according to the present invention.
Figure 42:
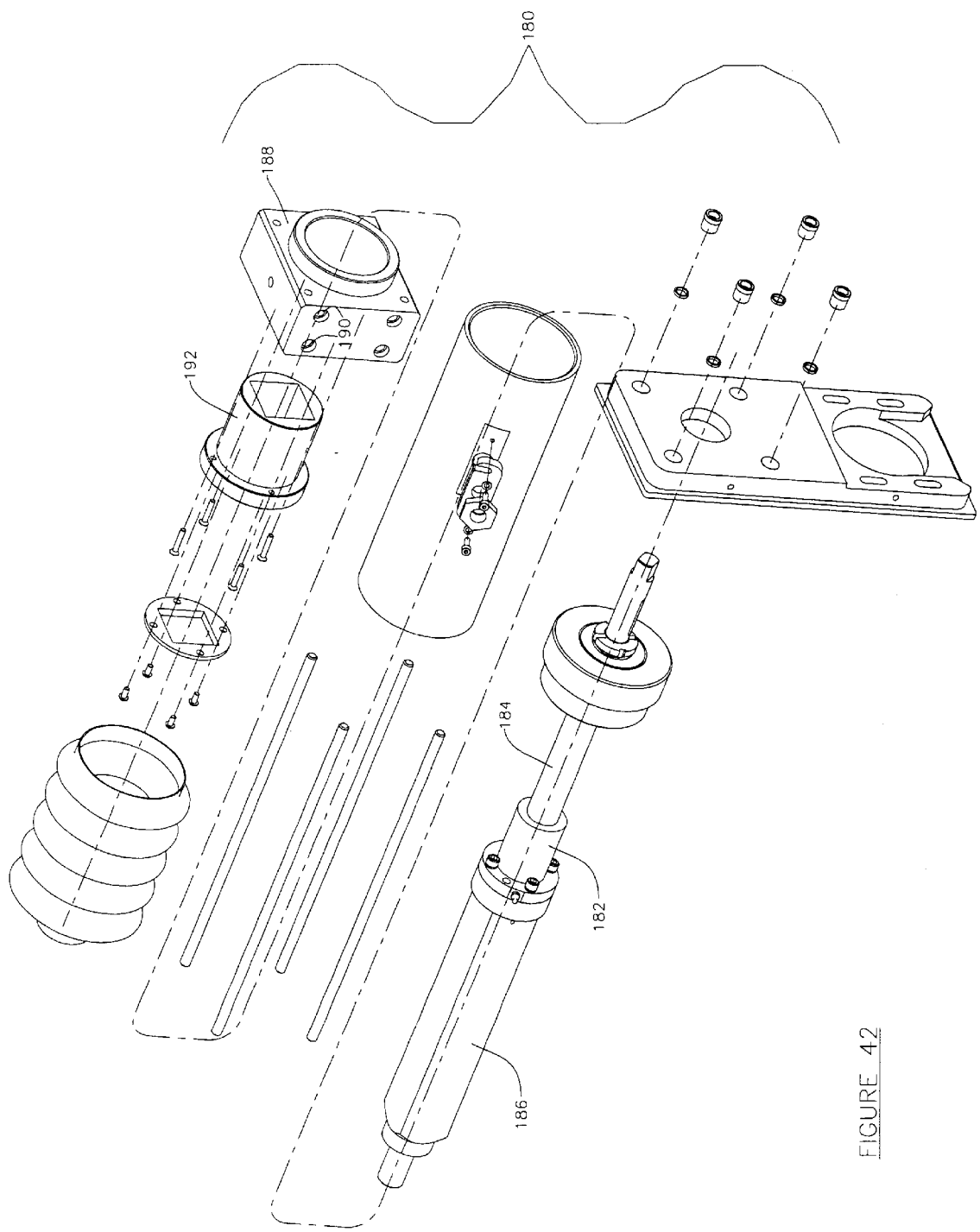
FIG. 42 is an exploded view of the servo actuator of FIG. 41.
Figure 43:
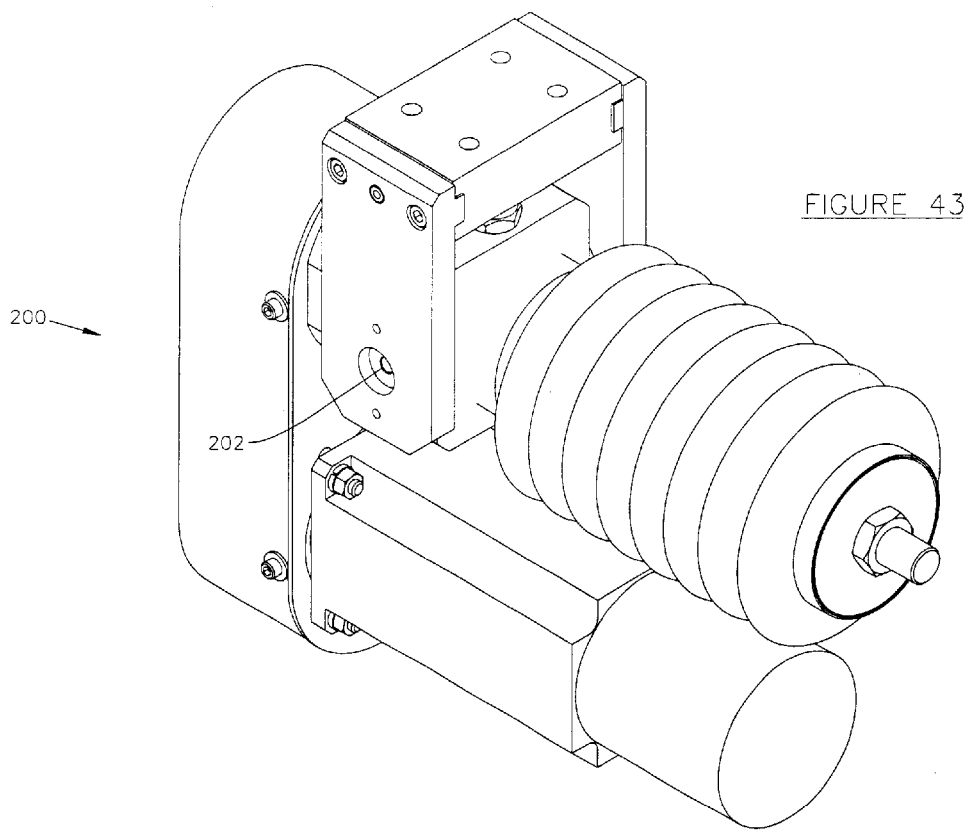
FIG. 43 is a perspective view of another embodiment of a servo actuator according to the present invention.
Figure 44:
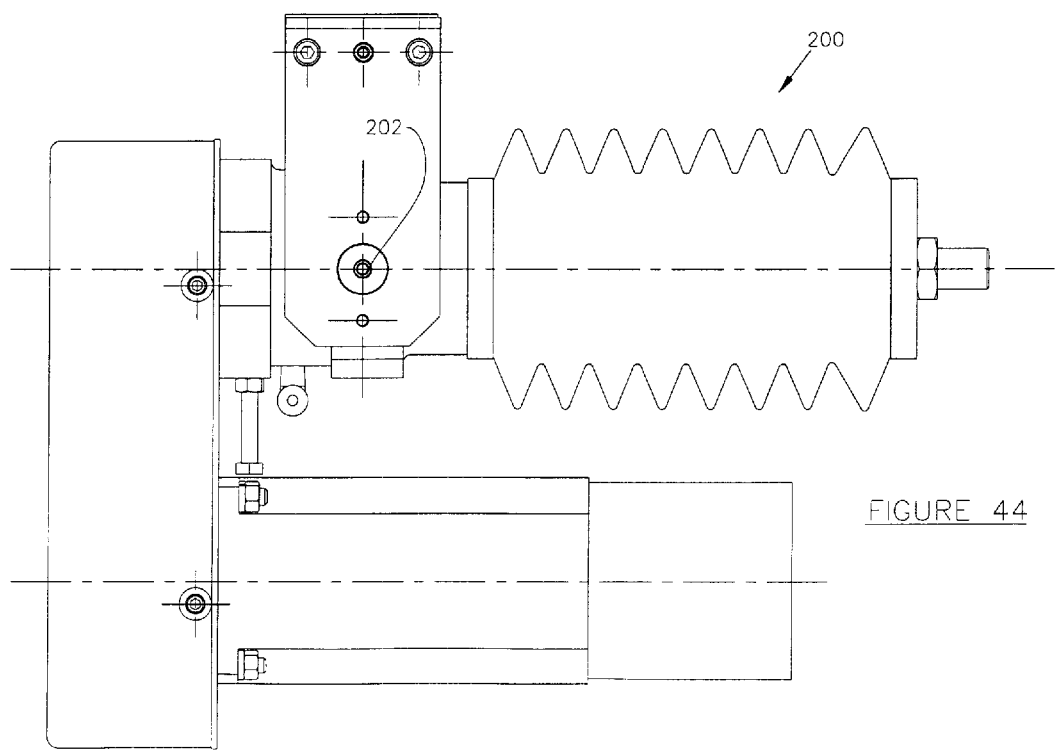
FIG. 44 is a side elevational view of the servo actuator of FIG. 43.
Figure 45:
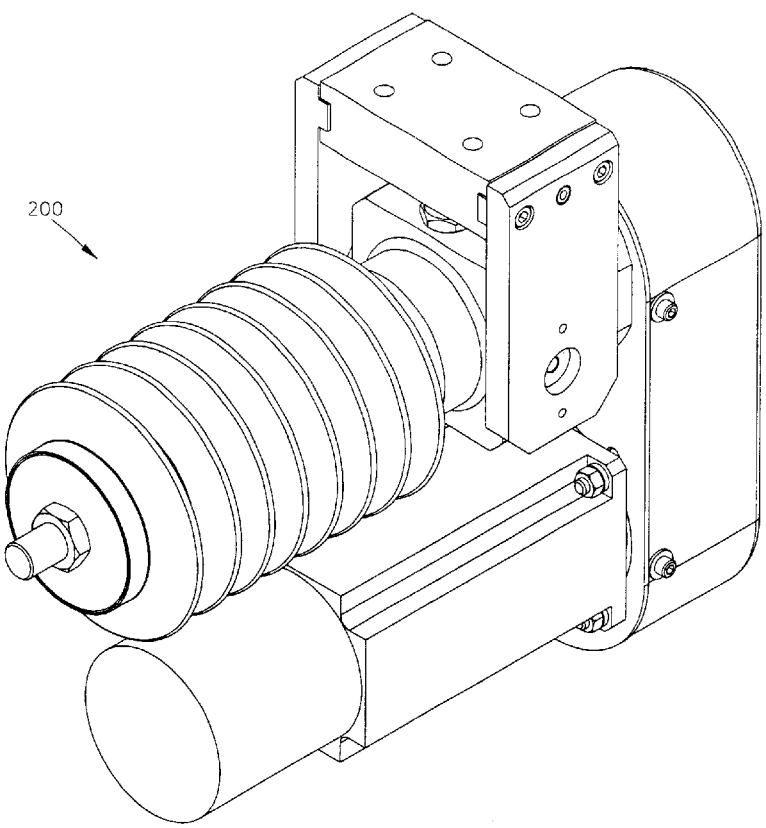
FIG. 45 is another perspective view of the servo actuator of FIGS. 43 and 44.
Figure 46:
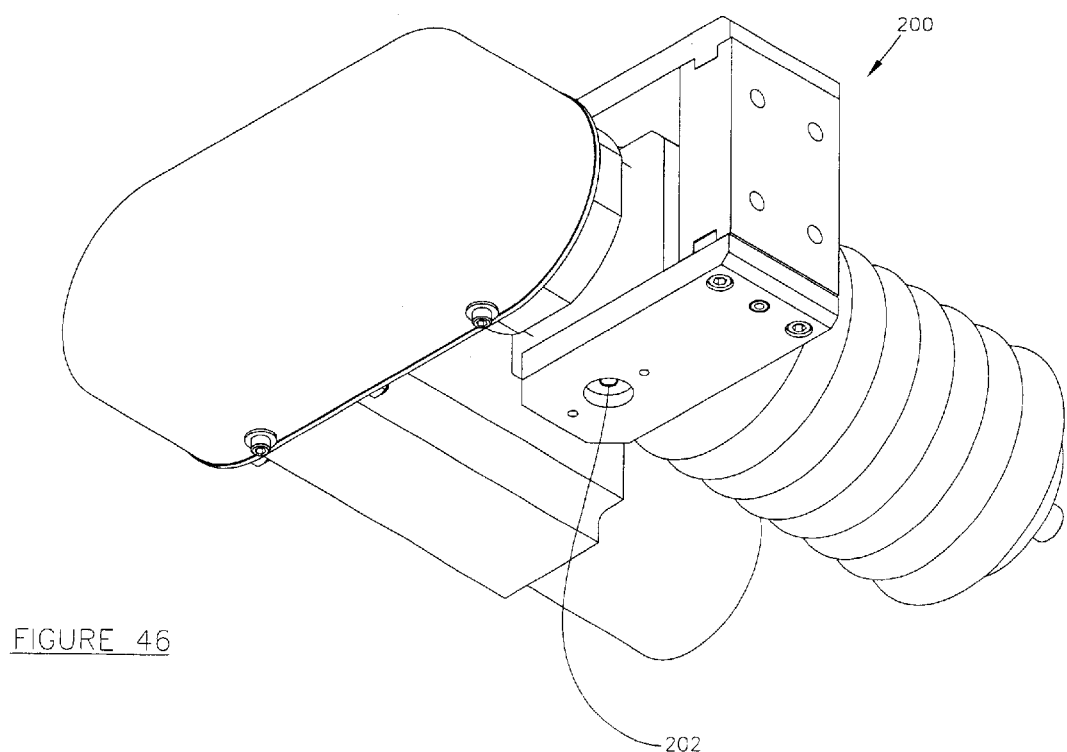
FIG. 46 is yet another perspective view of the servo actuator of FIGS. 43–45.
Figure 47:
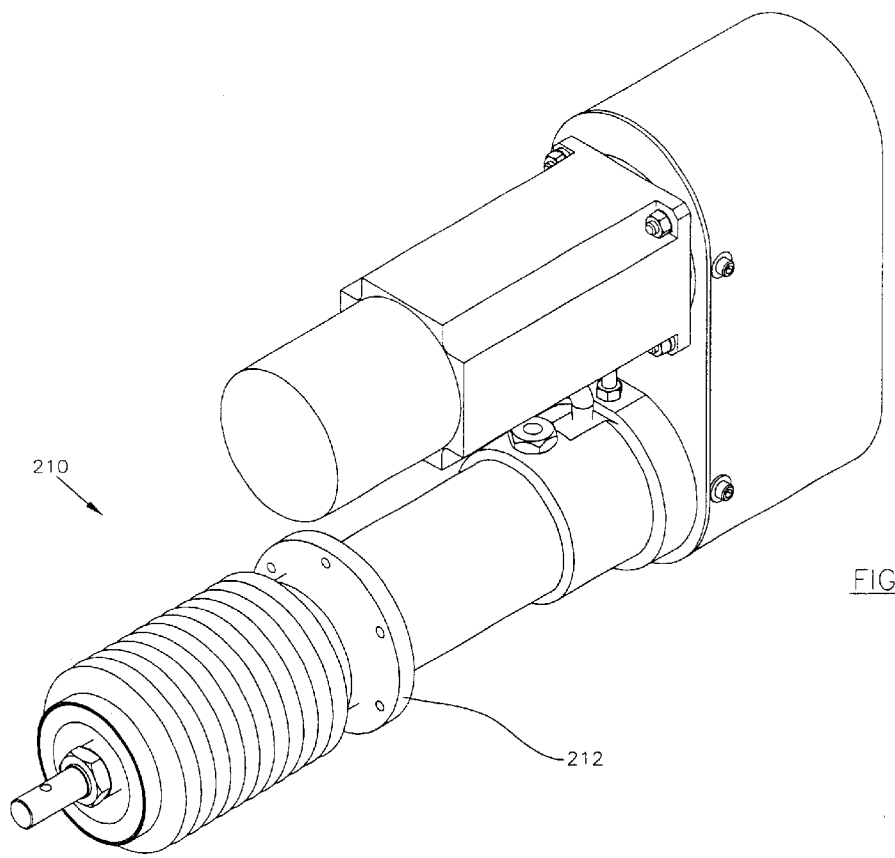
FIG. 47 is a perspective view of yet another alternative embodiment of a servo actuator according to the present invention.
Figure 48:
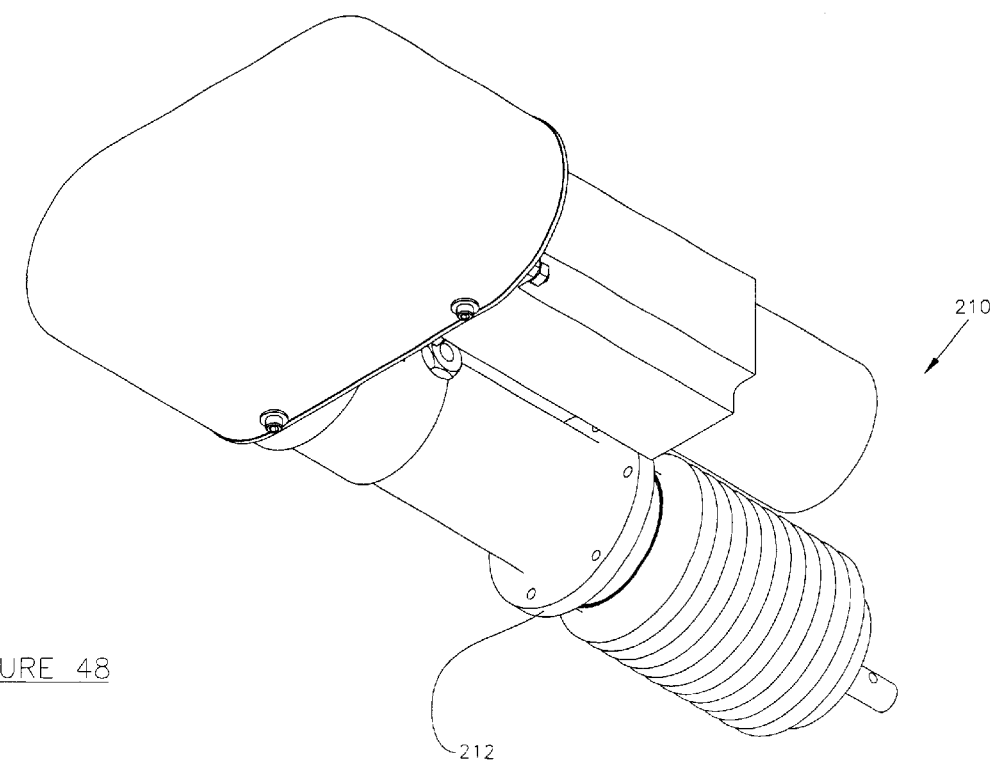
FIG. 48 is another perspective view of the servo actuator of FIG. 47.
Figure 49:
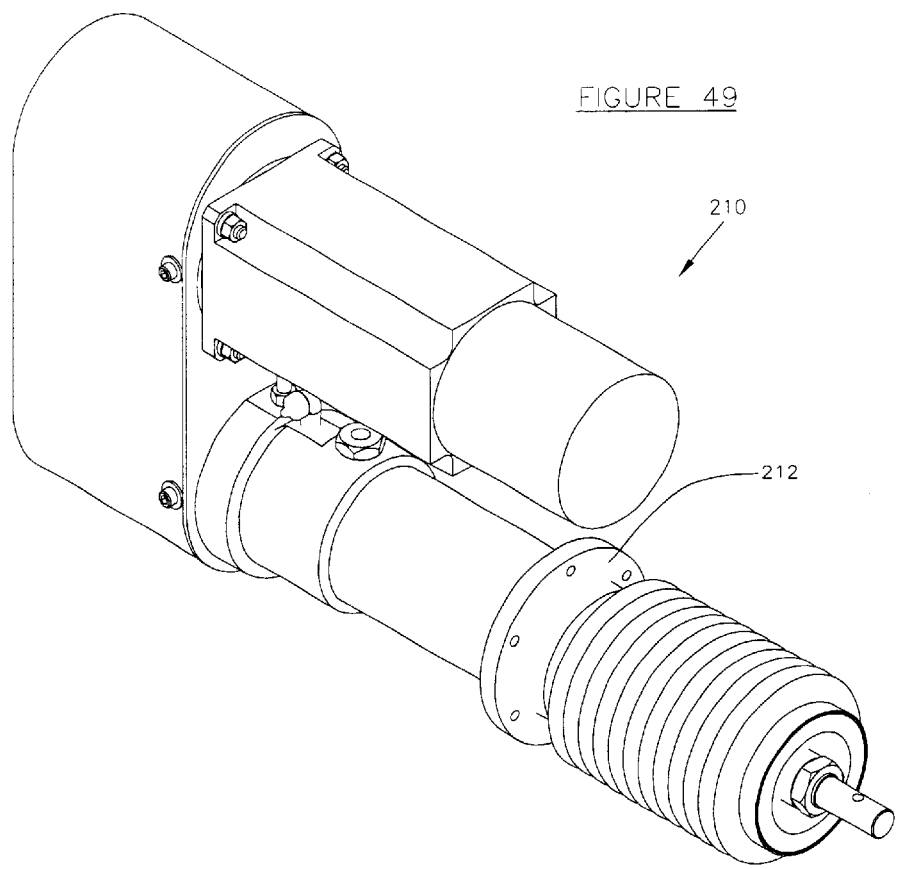
FIG. 49 is yet another perspective view of the servo actuator of FIGS. 47 and 48.
Figure 50:
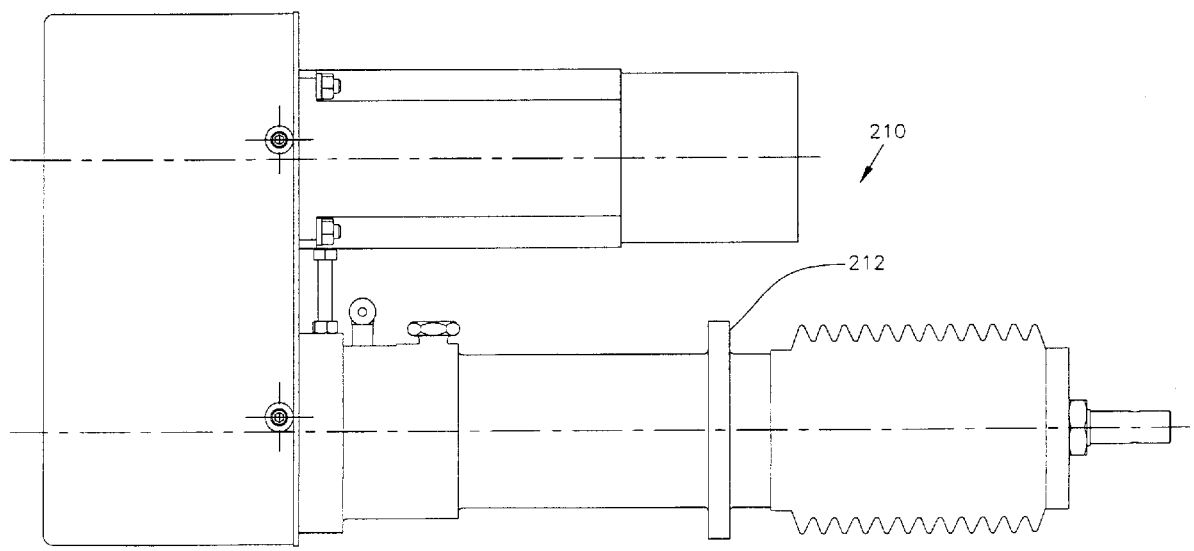
FIG. 50 is a side elevational view of the servo actuator of FIGS. 47–49.

Referring now to FIGS. 41 and 42, an alternative embodiment of a servo-actuator is illustrated. Specifically, FIG. 41 shows a cross-sectional view of a servo-actuator similar to the actuator shown in FIGS. 35–39. The actuator portion 180 is shown in exploded form in FIG. 42 to show the internal construction. This embodiment differs from the previous embodiment in that the nut 182 which engages the screw 184 is bolted to the end of the square rod 186 and is a somewhat different shape and size. It can also be seen that the trunnion 188 which defines the actuator end of the actuator portion 180 includes bolt holes 190 for interconnecting the trunnion 188, and the actuator, to a welding gun. A square bearing 192 fits into the trunnion 188 and defines the square opening in the front of the actuator that prevents rotation of the square rod 186. In FIG. 41, a different motor 194 is shown driving the actuator 180, although a variety of motors may be used.

Referring now to FIGS. 43–46, another configuration of a servo actuator 200 is shown. In a previous embodiment of a servo actuator, the trunnion mount was located near the actuator end of the actuator while in the servo actuator 200 in FIGS. 43–46, the trunnion mount 202 is mounted towards the rear. As will be clear to those of skill in the art, the modular system of the present invention may be adapted for use with either type of servo actuator.

Referring now to FIGS. 47–50, yet another version of a servo actuator 210 is illustrated. In this configuration the servo actuator 210 has a flange 212 for mounting it to a welding gun. The modular approach allows this type of actuator to be used as well.

As will be clear to those of skill in the art, the present invention may be adapted and modified in various ways without departing from the intent or scope of the present invention. It is the following claims, including all equivalents, which define the scope of the present invention.

I claim:

1. A modular welding gun comprising:
    a frame;
    an upper yoke and a lower yoke both interconnected with said frame, at least one of said yokes being movable with respect to said frame;
    an upper weld arm having a first end removably interconnected with said upper yoke and a second end configured to support an electrode;
    an upper electrode having a base supported by said second end of said upper weld arm and a welding end distal therefrom;
    a lower weld arm having a first end removably interconnected with said lower yoke and a second end configured to support an electrode;
    a lower electrode having a base supported by said second end of said lower weld arm and a welding end distal therefrom;
    a weld cap connected to each of said welding ends of said electrodes; and
    an actuator operable to move said at least one of said upper and said lower yokes between a welding position and a rest position.

2. A modular welding gun comprising:
    a frame;
    an upper yoke and a lower yoke both interconnected with said frame, at least one of said yokes being movable with respect to said frame, each of said yokes comprising a front plate and a rear plate interconnected by removable fasteners;

an upper weld arm having a first end removably interconnected with said upper yoke and a second end configured to support an electrode;

a lower weld arm having a first end removably interconnected with said lower yoke and a second end configured to support an electrode;

said weld arms being interconnected with said yokes by said first ends being gripped between said front and rear plates; and an actuator operable to move said at least one of said upper and said lower yokes between a welding position and a rest position.

3. A modular welding gun comprising:

a frame;

an upper yoke and a lower yoke both interconnected with said frame, at least one of said yokes a being movable with respect to said frame;

an upper weld arm having a first end removably interconnected with said upper yoke and a second end configured to support an electrode;

a lower weld arm having a first end removably interconnected with said lower yoke and a second end configured to support an electrode; and an actuator operable to move said at least one of said upper and said lower yokes between a welding position and a rest position; and an actuator arm having a first end removably interconnected with one of said yokes and a second end interconnected with said actuator.

4. A modular welding gun according to claim 1, wherein each of said yokes includes a pivot flange, said pivot flanges being parallel and interconnected by a bearing assembly.

5. A modular welding gun comprising:

a frame;

a lower yoke removably interconnected with said frame, said lower yoke comprising a front plate and a rear plate interconnected by removable fasteners;

a lower weld arm having a first end removably interconnected with said lower yoke and a second end configured to support an electrode, said first end being gripped between said front and rear plates; and an actuator supported by said frame and having an actuator rod with an electrode support disposed on the end thereof, said actuator being operable to move said electrode support in a linear direction toward and away from said second end of said lower weld arm.

6. A modular welding gun according to claim 2, further comprising an actuator arm having a first end removably interconnected with one of said yokes and a second end interconnected with said actuator.

7. A modular welding gun according to claim 2, wherein each of said yokes includes a pivot flange, said pivot flanges being parallel and interconnected by a bearing assembly.

8. A modular welding gun according to claim 3, wherein each of said yokes comprises a front plate and a rear plate interconnected by removable fasteners, said weld arms being interconnected with said yokes by said first ends being gripped between said front and rear plates.

9. A modular welding gun according to claim 3, wherein each of said yokes includes a pivot flange, said pivot flanges being parallel and interconnected by a bearing assembly.

10. A modular welding gun comprising:

a frame;

a non-cast lower yoke removably interconnected with said frame;

a lower weld arm having a first end removably interconnected with said lower yoke and a second end configured to support an electrode, said lower arm comprising a non-cast piece of bar stock; and an actuator supported by said frame and having an actuator rod with an electrode support disposed on the end thereof, said actuator being operable to move said electrode support in a linear direction toward and away from said second end of said lower weld arm.

11. A modular welding gun according to claim 10, wherein said lower yoke comprises a front plate and a rear plate interconnected by removable fasteners, said weld arm being interconnected with said yoke by said first end being gripped between said front and rear plates.

12. A modular welding gun comprising:

a frame;

an upper yoke and a lower yoke both interconnected with said frame, each of said yokes being non-cast, at least one of said yokes being movable with respect to said frame;

an upper weld arm having a first end removably interconnected with said upper yoke and a second end configured to support an electrode;

a lower weld arm having a first end removably interconnected with said lower yoke and a second end configured to support an electrode;

each of said weld arms being non-cast and formed from bar stock; and an actuator operable to move said at least one of said upper and said lower yokes between a welding position and a rest position.

* * * * *

UNITED STATES PATENT AND TRADEMARK OFFICE
CERTIFICATE OF CORRECTION

PATENT NO. : 6,596,958 B1
DATED : July 22, 2003
INVENTOR(S) : Wylie Chase

It is certified that error appears in the above-identified patent and that said Letters Patent is hereby corrected as shown below:

Title page,
Item [56], References Cited, U.S. PATENT DOCUMENTS, replace
"4,447,697  8/1984  Dune et al." with -- 4,447,697  5/1984  Dune et al. --; and
replace "3,396,260  8/1968  Waltonen" with -- 3,396,260  1/1965  Waltonen --

Column 1,
Line 37, replace "removable" with -- removably --.

Column 2,
Lines 6, 14, 23, 33, 39 and 48, after "embodiment of" insert -- the --.
Line 41, replace "Figs" with -- Fig --.

Column 9,
Line 17, replace "yokes a being" with -- yokes being --.

Column 10,
Line 27, replace "claim 10" with -- claim 15 --.

Signed and Sealed this

Twenty-second Day of June, 2004

JON W. DUDAS
*Acting Director of the United States Patent and Trademark Office*

Disclaimer 6,596,958 B1—Wylie Chase, Waterford, MI (US). MODULAR WELDING GUNS. Patent dated July 22, 2003. Disclaimer filed June 21, 2004, by the assignee, Milco Manufacturing Co.

Hereby enters this disclaimer to claims 1-12 of said patent.

*(Official Gazette, August 17, 2004)*